Figure 1:
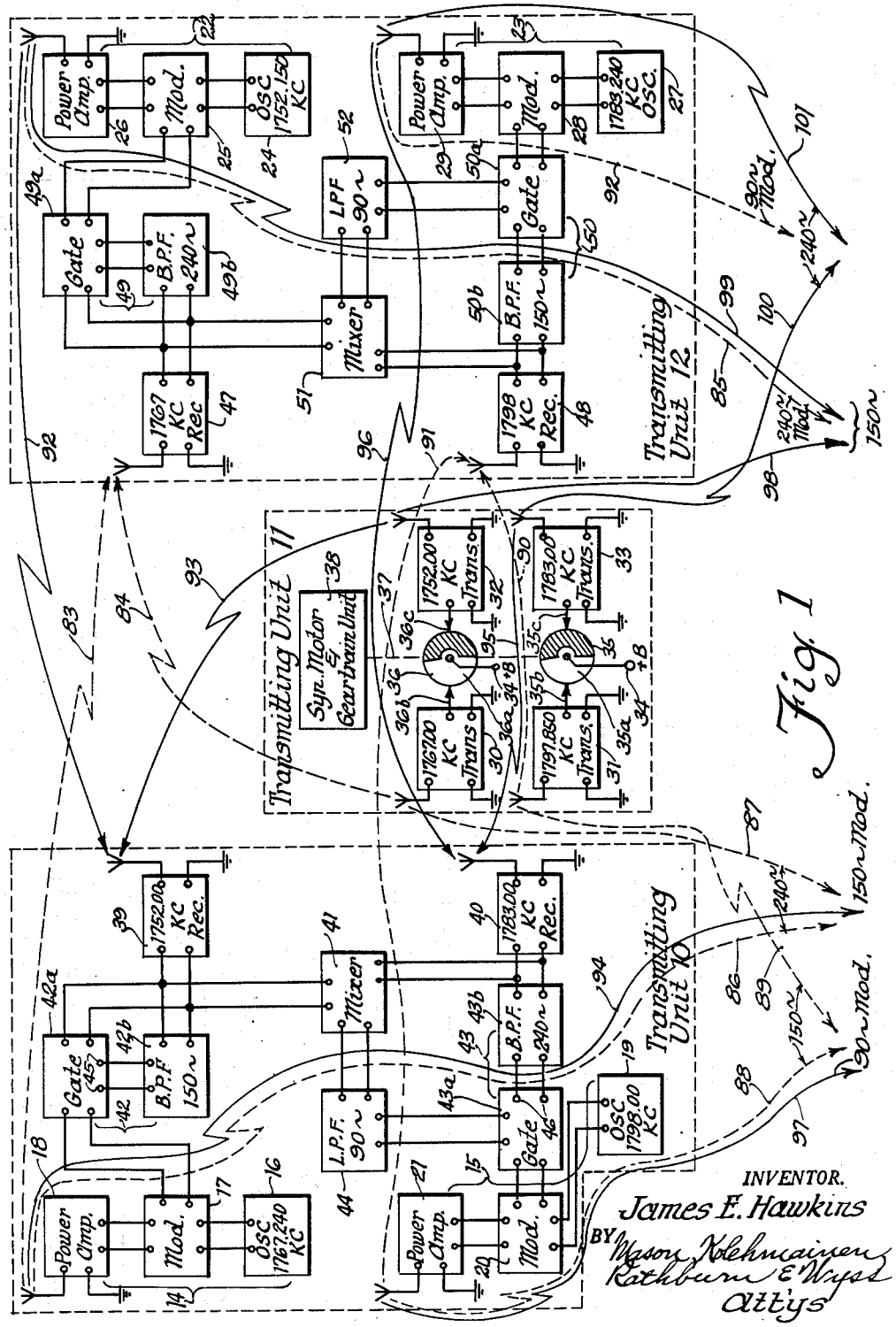

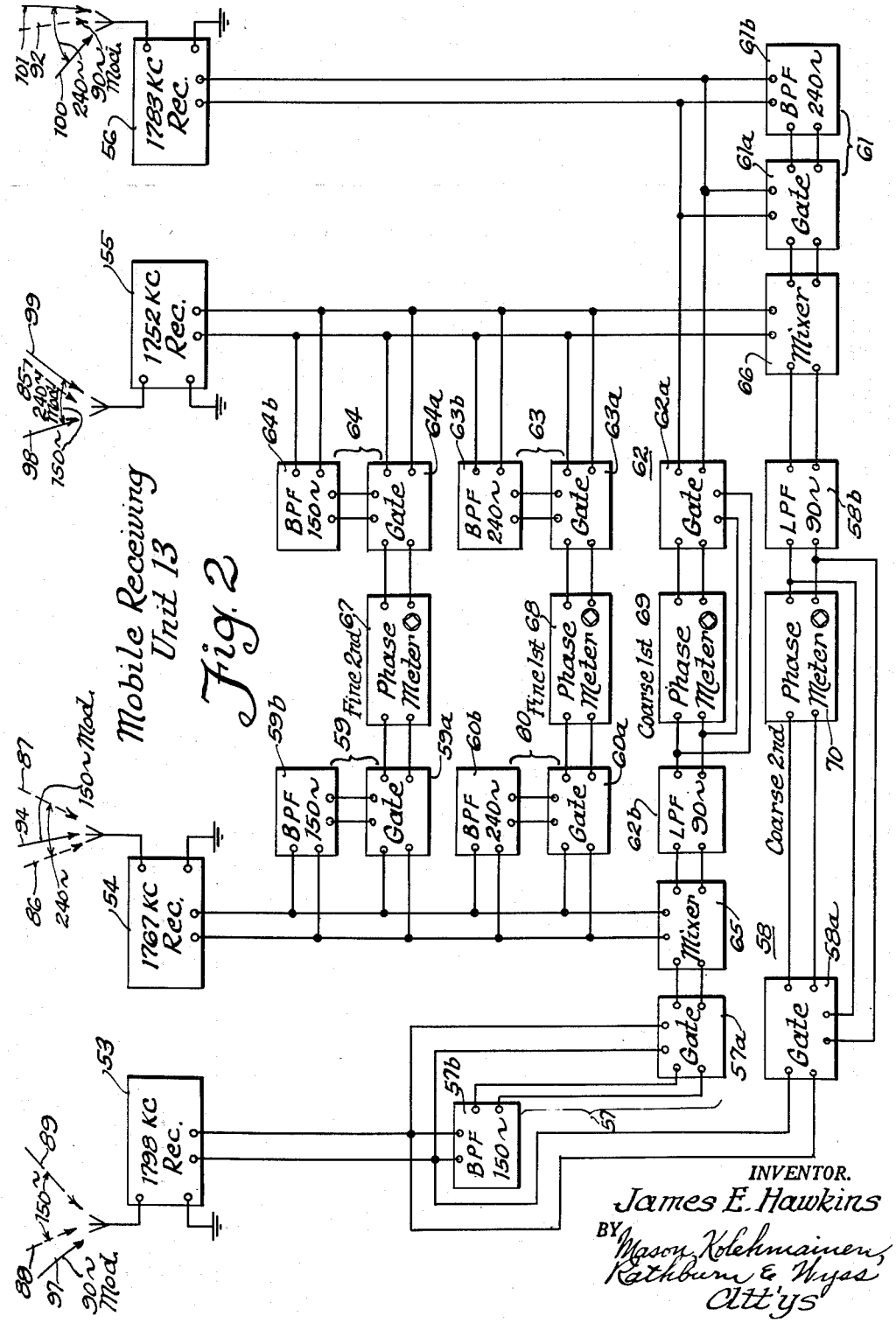

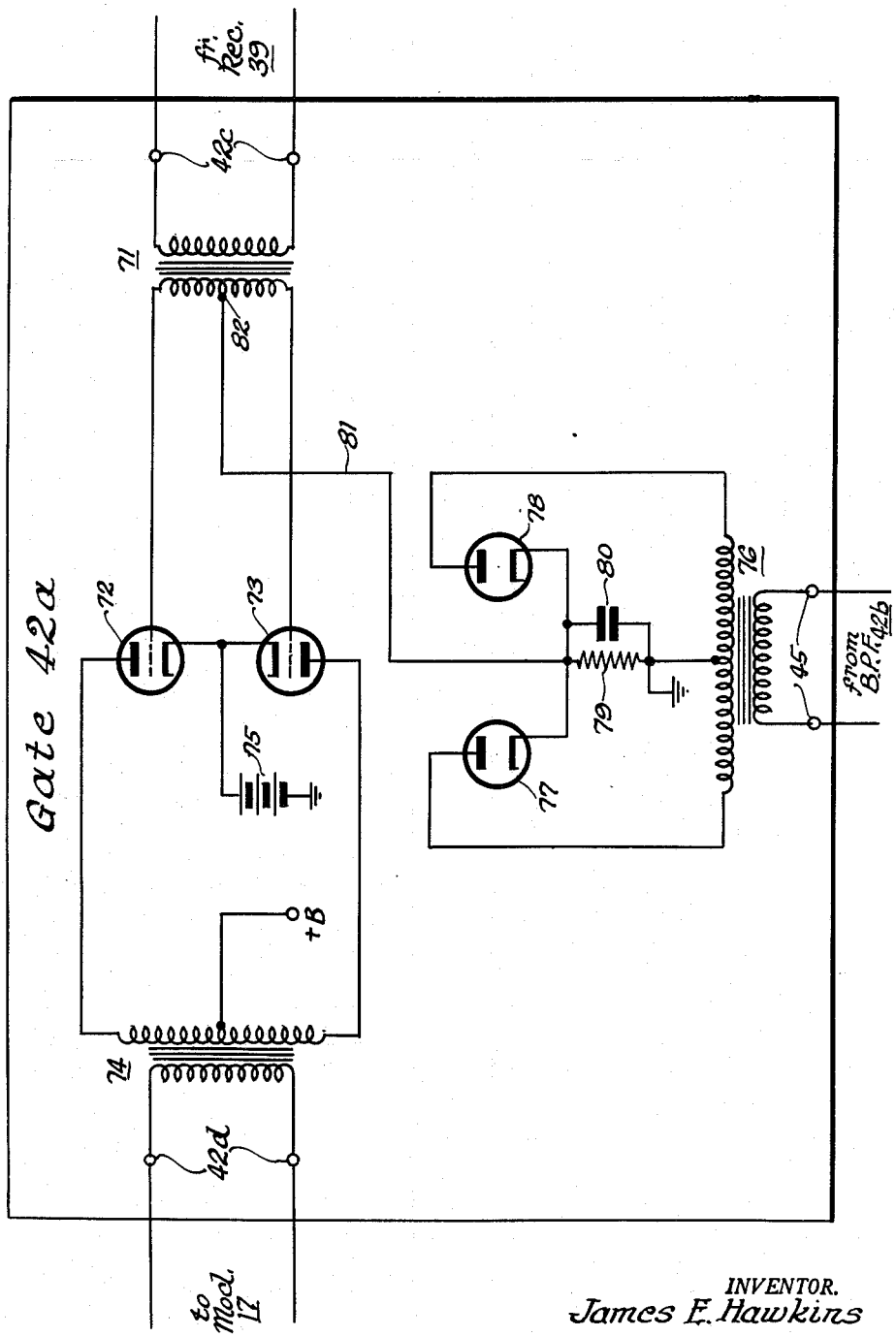

Feb. 17, 1953
J. E. HAWKINS
2,629,091
RADIO LOCATION SYSTEM
Filed Aug. 14, 1951
6 Sheets-Sheet 4
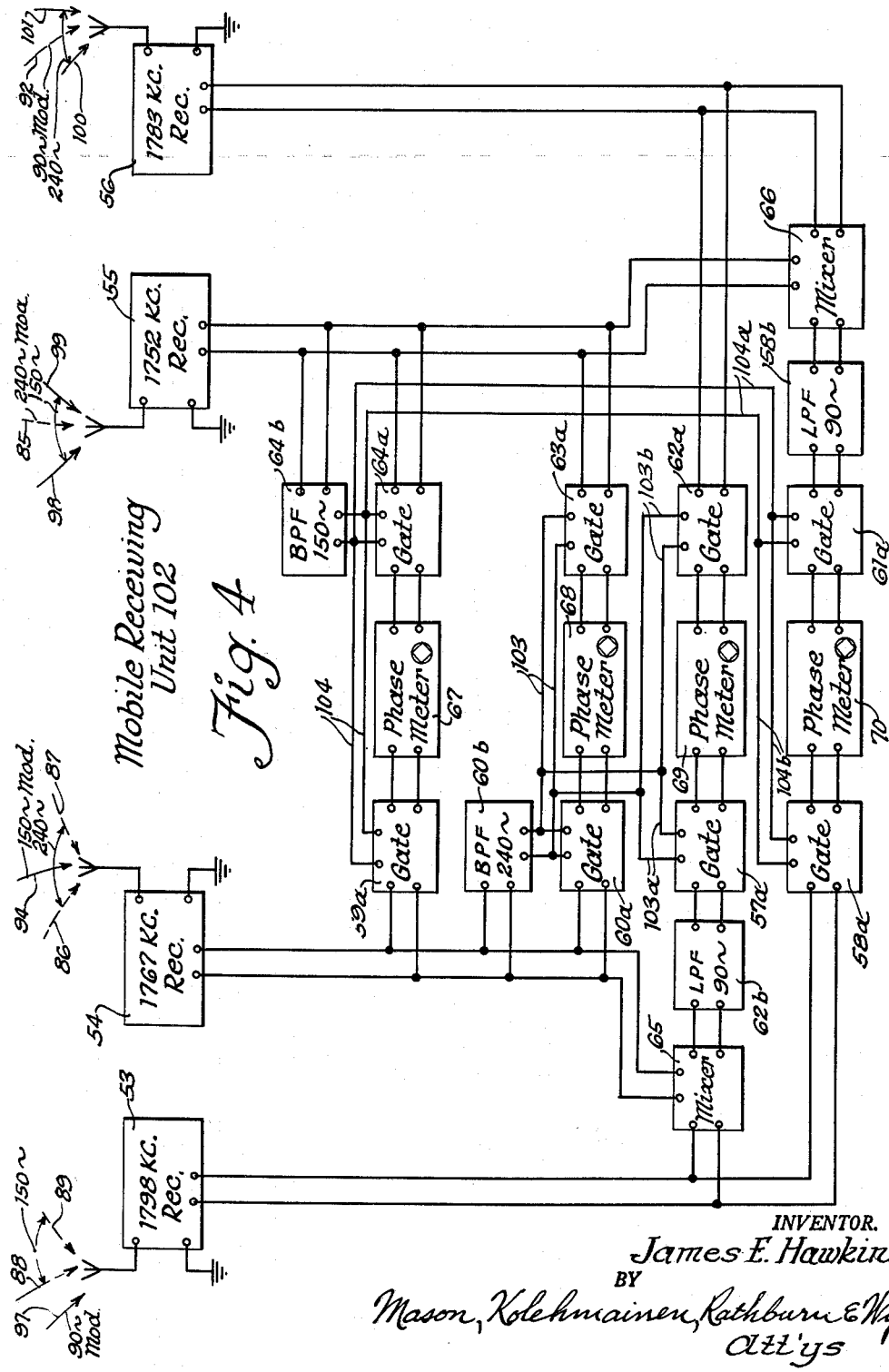
INVENTOR.
James E. Hawkins
BY
Mason, Kolehmainen, Rathburn & Wyss
Att'ys

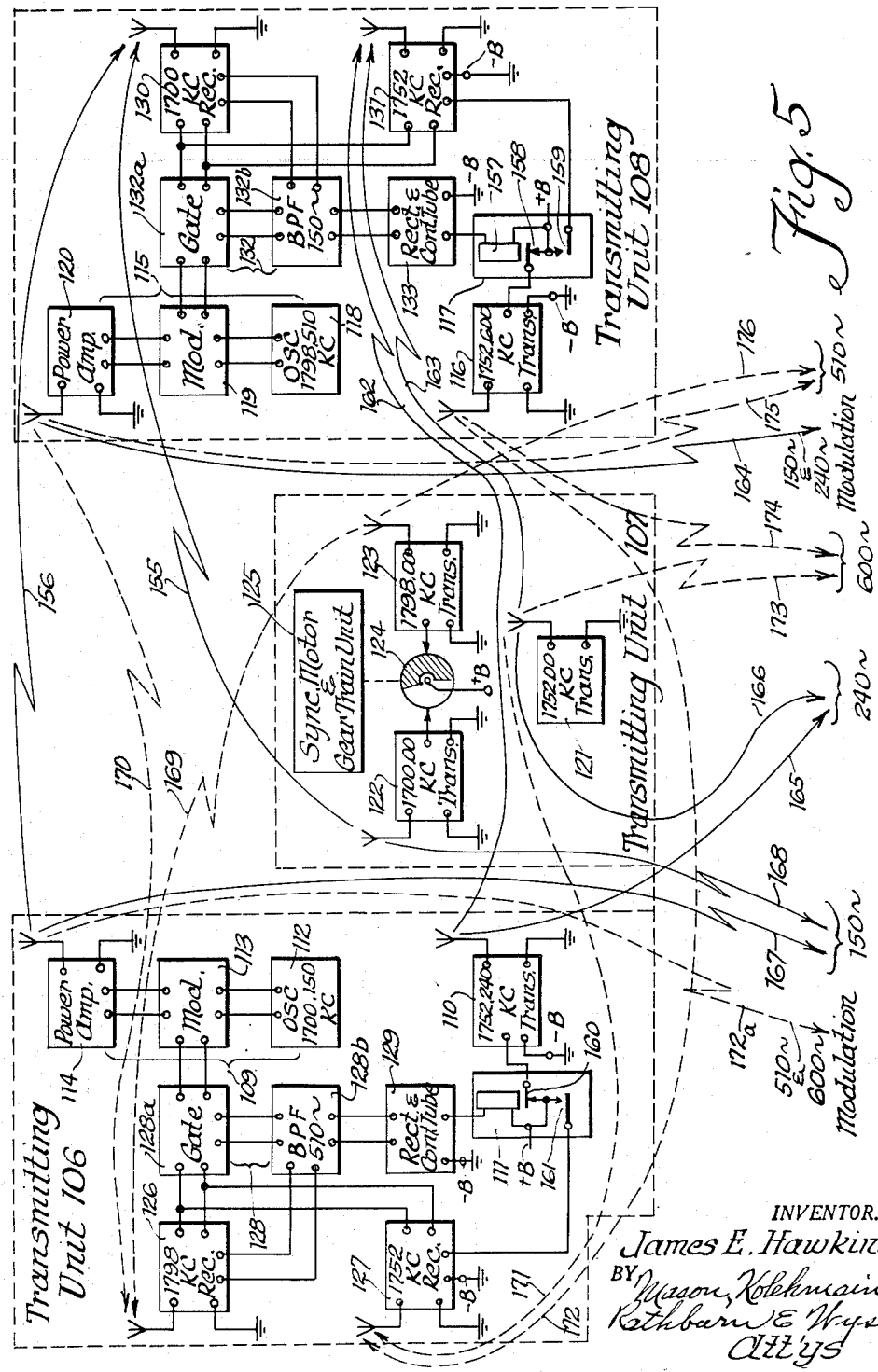

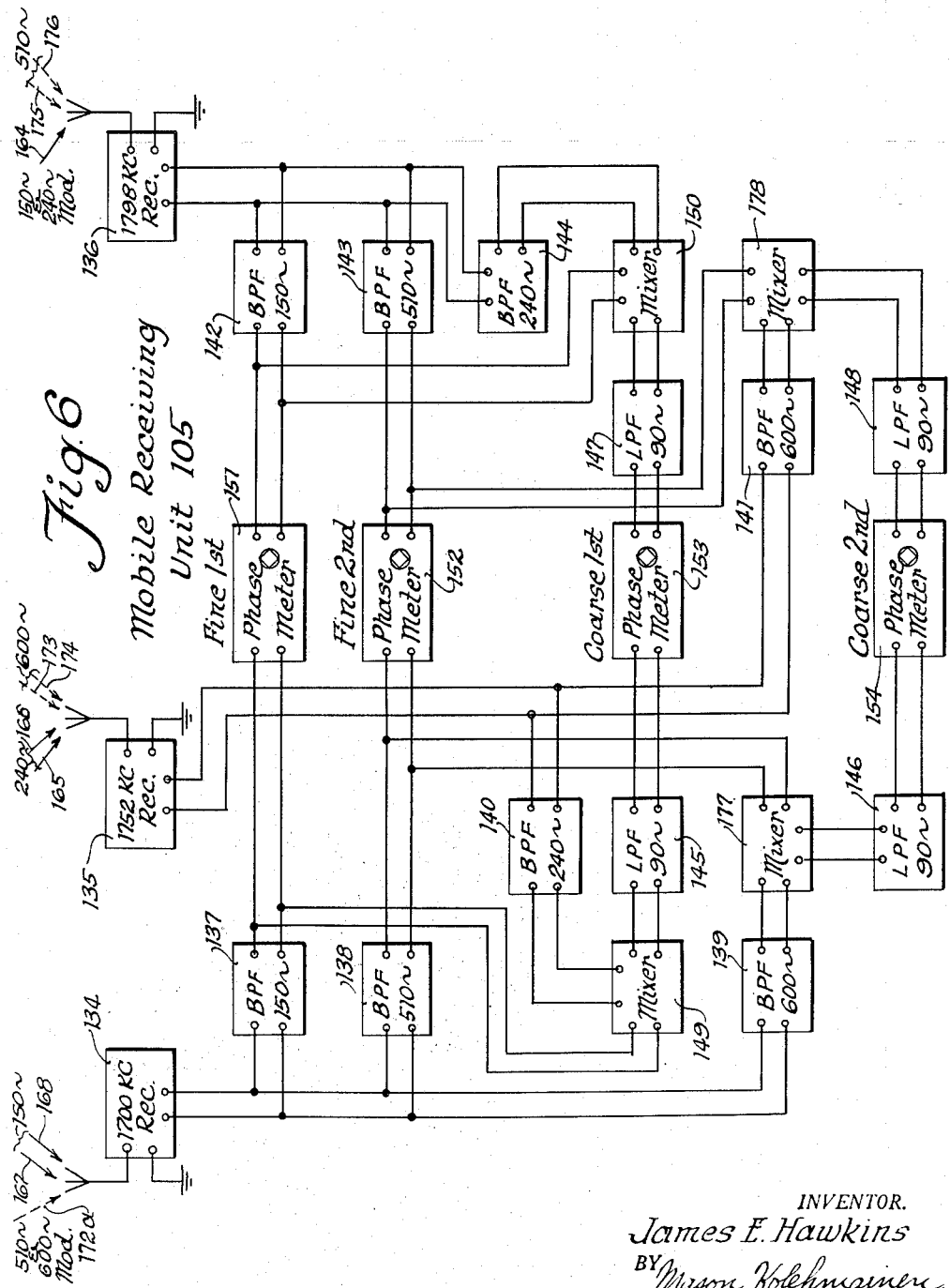

UNITED STATES PATENT OFFICE 2,629,091

RADIO LOCATION SYSTEM

James E. Hawkins, Tulsa, Okla., assignor to Seismograph Service Corporation, Tulsa, Okla., a corporation of Delaware Application August 14, 1951, Serial No. 241,776

29 Claims. (Cl. 343—105)

The present invention relates to radio location and distance determining systems and, although not limited thereto, relates more particularly to improvements in radio position finding systems of the hyperbolic, continuous wave type employing phase comparison in pairs of position indication signals radiated from a plurality of spaced transmitting points to provide one or more indications from which the position of a mobile receiving point relative to the known positions of the transmitting points may be determined without ambiguity and with precision accuracy.

In systems of the particular type referred to, the continuous waves radiated from each pair of transmitters produce standing waves in space, the phase relationship of which changes as a function of changing position between the two transmitting points. More specifically, the standing waves produced by each pair of transmitting units of the system are characterized by iso-phase lines which are hyperbolic in contour about the transmitting points as foci. On a line joining the pair of transmitters, these iso-phase lines may be spaced apart a distance equal to one-half of the wavelength of a wave having a frequency equal to the mean or average frequency of the radiated waves, and have diverging spacings at points on either side of this line, or in an improved system hereinafter referred to may be spaced apart a distance corresponding to so-called "phanton frequencies" representing the sum or difference of the mean or average frequencies. With this system arfrangement, the position of a receiving point relative to a pair of hyperbolic iso-phase lines may be determined by measuring the phase relationship between continuous waves radiated from the pairs of transmitters.

Since the point of location of the receiving point along the zone separating the two iso-phase lines is not indicated by such a phase measurement, it is desirable to employ at least three spaced transmitters, different pairs of which function to provide a grid-like pattern of intersecting hyperbolic lines, in order to obtain absolute determination of the position of the receiving point. Systems of the character described are exceedingly accurate in so far as the position indications produced at the receiving point are concerned. For the system to function, however, it is necessary to maintain phase synchronization between the continuous waves radiated by the spaced transmitters, or alternatively, so to arrange the system that phase shifts between the radiated waves are compensated during the phase comparing operation. Phase synchronization of the waves radiated from the plurality of transmitters presents an exceedingly difficult problem which has been the subject of considerable development work.

To obviate this problem, systems of the continuous wave hyperbolic type have been proposed (see Honore United States Patent No. 2,148,267 issued February 21, 1939) in which the phase shift problem is obviated by heterodyning the carrier waves of each pair of transmitters at a fixed link transmitting point, and modulating the difference frequency component of the heterodyned waves as a reference signal upon the carrier output of the link transmitter for radiation to the receiving point, where the difference frequency component is detected and phase compared with a difference frequency signal derived by directly heterodyning the transmitted continuous waves at the receiving point. In this manner, phase shifts between the continuous waves radiated from the two transmitters are completely compensated so that the measured phase angle is truly representative of the location of the receiving point between a pair of iso-phase lines.

While the described arrangement for obviating the phase synchronization problem is entirely satisfactory, it entails the use of two carrier channels for the link transmitters in addition to the three or four channels taken up by the three or four survey channels in order to make up a complete system. An improved arrangement for eliminating the link transmitters without eliminating the functions thereof is disclosed and broadly claimed in Hawkins and Finn Patent No. 2,513,317 issued July 4, 1950 wherein a pair of transmitters are alternately operated as link transmitters and as position signal transmitters. Another problem encountered in the operation of continuous wave systems is that of eliminating ambiguity from the phase measurements which provide the desired position information. Thus, while the two phase measurements identify the position of the receiving station relative to two intersecting pairs of hyperbolic isophase lines, they do not indicate which pairs of lines the indications are related to. This means that in operating the system the geographic location of the receiving system must be known at the start of movement of the receiving system relative to the transmitting stations and, furthermore, that the successive wavelengths must be counted as the receiving station is moved relative to the grid-like pattern of hyperbolic lines. It also means that a mobile craft entering the radiation pattern of the transmitters cannot utilize the radiaed signals to determine its position without employing auxiliary equipment to determine the approximate position of the craft relative to the signal transmitters.

In a copending application Serial No. 138,235 to James E. Hawkins filed January 12, 1950 entitled Radio Location System and assigned to the same assignee as the present invention, there is disclosed an improved radio location system of the continuous wave type which is free not only of phase synchronization difficulties but also of ambiguity problems. In the system of the said copending application, position indications are obtained having different sensitivities, termed phase sensitivities, insofar as the spacing of the iso-phase lines is concerned. More specifically, a plurality of low phase sensitivity position indications and a plurality of high phase sensitivity position indications are obtained, the low phase sensitivity indications being effective to locate the range of the high phase sensitivity indications and being characterized by widely spaced phase coincidences and the high phase sensitivity indications being characterized by closely spaced phase coincidences. The indications having phase sensitivities different from the phase sensitivity of the indications obtained by producing pairs of beat frequency signals in accordance with the principles of the Honore system are obtained by again heterodyning beat frequency signals produced in accordance with the Honore system to produce position indicating and reference signals for phase comparison which have phase sensitivities determined by phantom frequencies corresponding to the sum of or difference between the mean frequencies of the carrier waves from which the pairs of beat frequency signals were derived.

While this latter system completely solves the ambiguity problem a considerable number of transmitters and carrier channels are required and a number of narrow band pass filters must be employed to separate the various position indicating and reference signals, which adds to the expense and may cause phase shift difficulties unless the band pass filters are carefully selected and balanced. It is an object of the invention, therefore, to provide an improved radio location system of the continuous wave type which is free of phase synchronization difficulties of the character mentioned, in which the above mentioned disadvantages pertaining to ambiguity are entirely obviated, and in which the use of narrow band pass filters is minimized or eliminated.

It is another object of the present invention to provide an improved radio location system of the continuous wave type which is free of phase synchronization difficulties, in which certain of the position indications obtained have sensitivities, insofar as the spacing of the iso-phase lines is concerned, which will be referred to hereinafter as phase sensitivity, different from the phase sensitivity normally determined by the frequencies of the radiated waves and in which the number of carrier channels employed is minimized.

It is a further object of the present invention to provide a radio position finding system of the character described in which non-ambiguous position indications are obtained.

It is a still further object of the invention to provide a radio position finding system of the character described in which a plurality of low phase sensitivity position indications and high phase sensitivity position indications are obtained, the low phase sensitivity indications being effective to locate the range of the high phase sensitivity indications and being characterized by widely spaced phase coincidences, and the high phase sensitivity indications being characterized by closely spaced phase coincidences.

Still another object of the invention is to provide a radio position indicating system of the character described wherein such high phase sensitivity and low phase sensitivity position indications are obtained while employing a minimum number of carrier frequencies suitable for efficient long range propagation.

It is likewise an object of the present invention to provide improved transmission systems for use in radio location systems of the above indicated character.

It is also an object of the invention to provide improved receiving equipment for use in radio location systems of the above indicated character.

The invention, both as to its organization and method of operation, together with further objects and advantages thereof, will best be understood by reference to the specification taken in connection with the accompanying drawings in which:

Figs. 1 and 2 when taken together, constitute a diagrammatic representation of a three-foci position indicating system embodying the present invention, providing an unambiguous position fix by means of two sets of indications, each set including high and low phase sensitivity indications, Fig. 1 representing the transmitting end of the system and Fig. 2 representing the mobile receiving equipment;

Fig. 3 is a diagrammatic representation of a suitable gate circuit which may be employed in the equipment shown in Figs. 1 and 2;

Fig. 4 is a diagrammatic representation of a mobile receiving unit similar to that shown in Fig. 2, but employing a different gating arrangement; and Figs. 5 and 6 when taken together, constitute a diagrammatic representation of another form of three-foci position indicating system embodying the present invention, Fig. 5 representing the transmitting end of the system and Fig. 6 representing the mobile receiving equipment.

In the drawings, solid line and broken line arrows have been employed to indicate the receiving points of signal acceptance and the sources of the accepted signals during alternate periods in which certain of the transmitters are alternately operative in accordance with the arrangement disclosed in the aforesaid Patent No. 2,513,317 and as will be more fully described hereinafter.

Referring now to Figs. 1 and 2 of the drawings, the invention is illustrated as embodied in a three-foci hyperbolic continuous wave system for providing position information at a mobile receiving unit 13 (Fig. 2) which may be carried by a vessel or vehicle operating within the radius of transmission of a plurality of spaced transmitting units 10, 11 and 12. These units are preferably spaced apart approximately equal distances and are so positioned that the line joining the points of location of the units 10 and 11 is angularly related to the line joining the points of location of the units 11 and 12. As is described more fully hereinafter, the transmitting units 10 and 12 are equipped continuously to radiate a plurality of pairs of position indicating signals in the form of carrier waves of different frequencies while the transmitting unit 11 is equipped alternately to radiate two additional pairs of position indicating signals in the form of carrier waves of still different frequencies.

Specifically, the transmitting unit 10 comprises a pair of continuously operative transmitters 14 and 15, the transmitter 14 including a carrier wave oscillator 16 adapted for operation at a frequency of 1767.240 kilocycles, a modulator 17 and a power amplifier 18, whereby the output of the transmitter 14 constitutes a continuous carrier wave which, as is more fully described hereinafter, may have suitable modulation signals modulated thereon during certain periods of operation. Similarly, the transmitter 15 includes a carrier wave oscillator 19 adapted for operation at 1798.00 kilocycles, a modulator 20 and a power amplifier 21, whereby the output of the transmitter 15 constitutes a continuous carrier wave which may have suitable modulation signals modulated thereon during certain periods of operation as hereinafter more fully described.

Similarly, the transmitting unit 12 which is substantially identical with the transmitting unit 10 except for the operating frequencies of the various components, includes a pair of transmitters 22 and 23 which are continuously operative to radiate carrier waves of still different frequencies than those radiated by the transmitters 14 and 15. As shown in Fig. 1, the transmitter 22 comprises a carrier wave oscillator 24 adapted for operation at a frequency of 175.150 kilocycles, a modulator 25, and a power amplifier 26 whereby the output of the transmitter 22 constitutes a continuous carrier wave which may be modulated during certain periods of operation. The transmitter 23 comprises a carrier wave oscillator 27 adapted for operation at the frequency of 1783.240 kilocycles, a modulator 28 and a power amplifier 29 whereby the output of the transmitter 23 constitutes a continuous carrier wave which may, at appropriate times, have modulated thereupon suitable modulation signals.

The transmitting unit 11 comprises two pairs of transmitters 30—31 and 32—33 for respectively radiating additional position indicating carrier waves at distinctly different frequencies together with switchng means for alternately rendering one or the other of the two pairs of transmitters operative. In the arrangement illustrated, operation of either of the two pairs of transmitters 30—31 or 32—33 is accomplished by alternately feeding anode current to the electron discharge tubes of the respective transmitters from the positive terminals 34 of a suitable anode current source, not shown, through a pair of commutating rings 35 and 36 which are shaft connected by means of a shaft 37 so as to be driven at a constant speed by a synchronous motor and gear train unit 38.

More specifically, the positive terminals 34 of the anode current source are connected to the respective conducting segments 35a and 36a of the commutating rings 35 and 36, which conductive segments span slightly less than one-half of the circumference of each of the rings. The remainder of each of the rings 35 and 36 is composed of an insulating segment and at diametrically opposed points, suitable brushes 35b, 35c, 36b and 36c are provided, which engage the periphery of the respective rings. These brushes are respectively connected to the positive bus conductors of the respective transmitters whereby anode current is alternately delivered to the electron discharge tubes of the two pairs of transmitters. Since the conductive segments 35a and 36a represent slightly less than half the peripheral surface of the rings 35 and 36, it will be understood that a short off-period signal is provided between successive periods during which the transmitters 30—31 and 32—33 are alternately operative thus preventing simultaneous radiation of waves by both pairs of transmitters. The periodicity with which the two pairs of transmitters are alternately operated is, of course, dependent upon the speed of rotation of the commutating rings 35 and 36, and in the partciular embodiment of the invention shown, the rings are preferably driven at a speed of one revolution per second so that the two pairs of transmitters are alternately rendered operative at one-half second intervals.

Referring again to the transmitter unit 10, this unit comprises in addition to the transmitters 14 and 15, a pair of fixed tuned receivers 39 and 40, a mixer or heterodyne means 41, a pair of frequency responsive gate means 42 and 43, and a suitable low pass filter 44. The gate means 42, in addition to a suitable gate circuit 42a which will be described more fully hereinafter in connection with Fig. 3, includes a 150 cycle band pass filter 42b which is connected, as shown, between the output terminals of the receiver 39 and the control terminals 45 of the gate circuit 42a. The output terminals of the receiver 39 are likewise connected, as shown, to the mixer 41 and to the input terminals of the gate circuit 42a, the output terminals of the gate circuit being connected to the modulator 17. Similarly, the gate means 43 includes a gate circuit 43a and a 240 cycle band pass filter 43b which is connected between the output terminals of the receiver 40 and the control terminals 46 of the gate circuit 43a. The output terminals of the receiver 40 are likewise connected to the mixer 41 and the output terminals of the mixer 41 are connected through the low pass filter 44 to the input terminals of the gate circuit 43a, the output terminals of which are connected to the modulator 20.

The transmitting unit 12 as previously indicated, is substantially identical to the transmitting unit 10 and in addition to the transmitters 22 and 23, includes a pair of fixed tuned receivers 47 and 48, a pair of frequency responsive gate means 49 and 50, a mixer 51 and a low pass filter 52, the gate means 49 including a gate circuit 49a and a 240 cycle band pass filter 49b, and the gate means 50 including a gate circuit 50a and a 150 cycle band pass filter 50b. The circuit connections of the equipment in Fig. 12 are identical to those described in connection with unit 10 and are such that the output terminals of the gate 49a are connected to the modulator 25 while the output terminals of the gate 50a are connected to the modulator 28.

Referring now more particularly to Fig. 2, the mobile receiving unit 13 is shown as comprising a plurality of fixed tuned amplitude modulation receivers 53, 54, 55 and 56, a plurality of frequency responsive gate means 57, 58, 59, 60, 61, 62, 63 and 64, a plurality of mixers or heterodyning means 65 and 66, and a plurality of phase meters 67, 68, 69 and 70. Each of the gate means 57, 59, 60, 61, 63 and 64 includes a suitable band pass filter, which band pass filters are identified by corresponding reference numerals followed by the letter "b" for controlling the gate circuts, which gate circuits are identified by corresponding reference numerals followed by the letter "a".

The gates 58 and 62, however, in addition to the gate circuits 58a and 62a, include suitable low pass filters 58b and 62b.

As indicated in the drawings, the receiver 53 is fixed tuned to a center frequency of 1798 kilocycles and is designed to accept the carrier waves radiated by either of the transmitters 15 or 31; the receiver 54 is fixed tuned to a center frequency of 1767 kilocycles and is designed to accept the carrier waves radiated by either of the transmitters 14 or 30; the receiver 55 is fixed tuned to a center frequency of 1752 kilocycles and is designed to accept the carrier waves radiated by either of the transmitters 32 or 22; and the receiver 56 is fixed tuned to a center frequency of 1783 kilocycles and is designed to accept the carrier waves radiated by either of the transmitters 33 or 23.

The various band pass filters employed in the transmitting units 10 and 12 and in the receiving unit 13 are sharply tuned audio filters which may be of any standard commercial construction, and the phase meters 67, 68, 69 and 70 may likewise be of standard construction although they are preferably of the type disclosed in Hawkins et al. Patent No. 2,551,211 issued May 1, 1951. As more fully described in the prior Hawkins et al. Patent No. 2,513,318 issued July 4, 1950, the use of sharply tuned audio filters for separating the various position indicating and reference signals, may cause phase shift difficulties due to differing frequency response characteristics of the filters. Furthermore, even though such filters are made symmetrical and carefully balanced, variation in the existing temperatures at the various transmitting units will cause unsymmetrical variations in the filter characteristics.

It will be observed, however, that in the system illustrated in Figs. 1 and 2, the sharply tuned audio filters are employed only in the control circuits for the gates rather than in the circuits for the signals which are to be phase compared. Various types of gate circuits may be employed in systems embodying the present invention so long as the gate circuits selected provide a distortionless wide pass band, and in Fig. 3 there is shown a suitable gate circuit which is identified, for example, as the gate circuit 42a at the transmitting unit 10. As shown in Fig. 3, the gate circuit includes a suitable input and isolating transformer 71, the primary winding of which is connected to the input terminals 42c of the gate circuit 42a, and the secondary winding of which is connected to the grids of a pair of three-element electron discharge devices 72 and 73 which are connected in push-pull relation and biased for class A operation. The anode-cathode circuits of the tubes 72 and 73 are connected, as shown, to the primary winding of an output transformer 74, the secondary winding of which is connected to the output terminals 42d of the gate circuit 42a. Normally, the tubes 72 and 73 are biased beyond cutoff as, for example, by a battery 75 connected to the cathodes of the tubes so that no signal will pass from the input terminals to the output terminals of the gate circuit. As previously described, however, the control terminals 45 are connected for energization from the 150 cycle band pass filter 42b and, as shown in Fig. 3, these terminals are connected to the primary winding of a control transformer 76, the secondary winding of which is connected to a full wave rectifier comprising the two-element tubes 77 and 78, the rectifier circuit including a suitable cathode load resistor 79 and a bypass condenser 80. As shown, one end of the load resistor 79 is connected by a suitable conductor 81 to a mid tap 82 on the secondary winding of the input transformer 71, which supplies the grids of the tubes 72 and 73. Thus, whenever a 150 cycle signal is supplied through the band pass filter 42b to the control terminals 45 of the gate circuit 42a, a rectified positive voltage will be applied to the grids of the tubes 72 and 73 so as to reduce the negative bias on the tubes to the proper value for class A operation. Consequently, so long as the 150 cycle signal is present at the control terminals any signals supplied to the input terminals 42c will be conducted through the gate circuit 42a without distortion to the output terminals 42d.

Considering now the operation of the system shown in Figs. 1 and 2, when the commutating rings 35 and 36 are in the position shown in Fig. 1, anode current will be supplied to the transmitters 30 and 31 and these transmitters together with the transmitters 14, 15, 22 and 23 will radiate signals at the indicated frequencies. As indicated by the broken line arrows 83 and 84, the signals radiated by the transmitter 14 at the unit 10 and the transmitter 30 at the unit 11, will be accepted by the receiver 47 at the transmitting unit 12, the selectivity of the receiver 47 being such that the signals radiated by the transmitter 15 and the transmitter 31 are rejected in the radio frequency section of the receiver. The beat frequency of 240 cycles between the two carrier waves accepted by the receiver 47 is reproduced in the audio frequency section of the receiver and delivered through the 240 cycle band pass filter 49b to the control terminals of the gate circuit 49a, whereby the gate circuit is opened, i. e. rendered conductive. At the same time, this 240 cycle beat frequency signal is delivered to the input terminals of the gate circuit 49a and passes through the gate to the modulator 25 for modulation on the 1752.150 kilocycle carrier wave radiated by the transmitter 22. As indicated by the broken line arrow 85, this carrier wave, modulated with the 240 cycle reference signal is radiated to and accepted by the receiver 55 at the mobile receiving unit 13. At the same time, as indicated by the broken line arrows 86 and 87, the carrier waves of 1767.240 kilocycles and 1767.00 kilocycles respectively radiated by the transmitters 14 and 30, are radiated to and accepted by the receiver 54 at the receiving unit 13.

In addition to the transmitters 14, 30 and 22, it will be remembered that the transmitters 15, 31 and 23 are also operative during this portion of the cycle and, as indicated by the broken line arrows 88 and 89, the carrier frequencies of 1798.00 kilocycles and 1797.850 kilocycles respectively radiated by the transmitters 15 and 31, are radiated to and accepted by the receiver 53 at the receiving unit 13. Likewise, as indicated by the broken line arrows 90 and 91, the same two carrier waves are accepted by the receiver 48 at the transmitting unit 12 and the beat frequency of 150 cycles between the two carrier waves is reproduced in the audio frequency section of the receiver and delivered through the sharply tuned band pass filter 50b to the control terminals of the gate circuit 50a, thereby rendering the gate circuit conductive. In addition, the 150 cycle beat frequency signal reproduced at the receiver 48 together with the 240 cycle beat frequency signal reproduced at the receiver 47, are supplied to the input terminals of the mixer or heterodyning means 51. In the mixer 51, the two beat frequency signals are heterodyned to produce a 90 cycle beat frequency signal which is delivered through the low pass 90 cycle filter 52 to the input terminals of the gate circuit 50a. Since the gate circuit 50a has been rendered conductive by the presence of the 150 cycle signal delivered from the band pass filter 50b, the 90 cycle signal from the mixer 51 will be supplied through the gate circuit to the modulator 28 for modulation on the 1783.240 carrier wave signal radiated by the transmitter 23 and, as indicated by the broken line arrow 92, this modulated wave will be radiated to and accepted by the receiver 56 at the receiving unit 13.

At the receiving unit 13, the beat frequency of 240 cycles which exists between the carriers from the transmitters 14 and 30 represented by the broken line arrows 86 and 87, is reproduced in the audio frequency section of the receiver 54 and is supplied through the band pass filter 60b to the control terminals of the gate 60a so as to render the gate circuit conductive and, at the same time, this 240 cycle beat frequency signal is supplied through the conductive gate 60a to one pair of input terminals of the phase meter 68. At the same time, the 240 cycle reference signal which is modulated on the carrier wave radiated from the transmitter 22 and represented by the broken line arrow 85, will be reproduced in the receiver 55 and supplied from the output terminals of the receiver through the 240 cycle band pass filter 63b to the control terminals of the gate circuit 63a so as to render the gate circuit conductive. Accordingly, this 240 cycle reference signal which is also supplied to the input terminals of the gate 63a passes through the gate circuit to the opposite terminals of the phase meter 68, which phase meter functions to measure the phase relationship between the 240 cycle position indicating signal from the receiver 54 and the 240 cycle reference signal from the receiver 55, thereby providing a position indication of the mobile unit 13 relative to the transmitting units 10 and 11.

As previously indicated, the phase sensitivity of the position indication thus obtained, is determined by the mean or average frequency of the radiated waves and since the mean or average frequency of the carrier waves radiated by the transmitters 14 and 30 is 1767.120, the iso-phase lines representative of the same phase relationship between the standing waves produced by the transmitters 14 and 30 along a line joining the units 10 and 11 would be spaced apart a distance of approximately 278 feet. This may be considered as the fine or high phase sensitivity position indication with respect to the transmitting unit 10 and 11.

Simultaneously, with the above described energization of the phase meter 68 to provide this fine position indication, the receiver 53 at the unit 13 is effective to reproduce in the audio frequency section thereof the beat frequency differences of 150 cycles between the waves radiated by the transmitters 15 and 31 so as to produce in the output of the receiver 53 a 150 cycle beat frequency signal which is supplied through the band pass filter 57b to the control terminals of the gate 57a. Likewise, this 150 cycle beat frequency signal is supplied to the input terminals of the gate circuit 57a and to the input terminals of the gate circuit 58a. Since, however, the gate 58a is normally closed, the 150 cycle beat frequency signal will not pass through the gate means 58. On the other hand, the gate circuit 57a has been rendered conductive by the 150 cycle beat frequency signal supplied through the band pass filter 57b and accordingly, this 150 cycle signal is supplied through the gate 57a to the mixer or heterodyne means 65 which is also supplied, as shown, with the 240 cycle beat frequency signal developed at the receiver 54 as previously described. In the mixer 65, a 90 cycle position indicating signal is produced which passes through the low pass filter 62b to the left hand terminals of the phase meter 69. This 90 cycle position indicating signal is also supplied, as shown, to the control terminals of the gate circuit 62a so as to render this gate circuit conductive. The input terminals of the gate circuit 62a are connected, as shown, to the output terminals of the receiver 56 which is receiving the modulated carrier wave from the transmitter 23 represented by the broken line arrow 92. In the receiver 56, the 90 cycle modulation component is reproduced at the output terminals and accordingly is supplied through the conducting gate 62a to the right hand terminals of the phase meter 69 for phase comparison with the 90 cycle position indicating signal produced in the mixer 65.

As previously indicated, the phase sensitivity of the 90 cycle position indicating and reference signals is determined by the ratio between the mean frequencies of the waves transmitted by the pair of transmitters 14 and 30 from which the 240 cycle beat frequency signal was produced and the pair of transmitters 15 and 31 from which the 150 cycle beat frequency signal was produced. Since, with respect to each of these pairs of transmitters, the transmitter at the unit 10 is of higher frequency than the transmitter at the unit 11, hereby providing a phase shift of the same sense in each of the beat frequency signals, heterodyning the 150 cycle and 240 cycle beat frequency signals in the mixer 65, produces an output signal, the phase of which will vary by the difference between the 1767.120 kilocycle mean frequencies of the transmitters 14 and 30 and the 1798.075 kilocycle mean frequency of the transmitters 15 and 31. In other words, the phase sensitivity of the 90 cycle position indicating signal supplied to the phase meter 69 will correspond to a carrier signal of approximately 30.955 kilocycles which may be termed a phantom frequency equal to the difference between the real mean frequencies. Thus, when the 90 cycle position indicating signal is phase compared with the 90 cycle reference signal supplied from the receiver 56, a much smaller number of lanes or 360° phase coincidences between the transmitting units 10 and 11 will be obtained and these iso-phase lines will be spaced apart along the line joining the units 10 and 11, a distance equal to one-half the wave length of a wave having a frequency of 30.955 kilocycles or a distance of approximately 15,900 feet. It will thus be observed that the phase meters 68 and 69 provide two position indications of different sensitivity indicative of the position of the mobile receiving unit 13 relative to the transmitting units 10 and 11. The low phase sensitivity reading obtained from the phase meter 69 may thus be employed to establish within which of the pairs of iso-phase lines spaced 278 feet apart and indicated by the phase meter 68 the mobile receiving unit 13 is positioned.

At the end of the above described transmitting interval, the commutating rings 35 and 36 function to interrupt the circuits for delivering anode current to the tubes of the transmitters 30 and 31 with the result that carrier wave radiation from these transmitters is terminated. When radiation of these waves stops, the carrier heterodyning action of the receivers 47 and 48 is likewise terminated to interrupt the reference signal radiations by the transmitters 22 and 23 and to interrupt the heterodyne or difference frequency signals being developed across the output terminals of the receivers 53 and 54 at the receiving unit. Thus, the phase meters 68 and 69 are rendered ineffective further to change the setting of their respective indicating elements and it will be noted that in the absence of the heterodyne signals produced by the receivers 47, 48, 53 and 54, the various associated gate circuits 49a, 50a, 57a, 60a and 62a become nonconductive, which further insures that the phase meters 68 and 69 will become ineffective and likewise isolates these phase meters from their respective energizing circuits.

A short time interval after operation of the transmitters 30 and 31 is stopped, the commutating rings 35 and 36 function to deliver anode current to the tubes of the transmitters 33 and 32 respectively, thus rendering these transmitters operative. Accordingly, during the next half cycle, only the transmitters 14, 15, 22, 23, 32 and 33 will be operative.

As indicated by the solid line arrows 92 and 93 in Fig. 1, the 1752.150 kilocycle and the 1752.00 kilocycle carrier waves radiated by the transmitters 22 and 32 are radiated to and accepted by the receiver 39 at the transmitting unit 10, which receiver functions to produce in its output circuit the 150 cycle beat frequency difference between these carrier waves. This 150 cycle signal is supplied, as shown in Fig. 1, through the band pass filter 42b to the control terminals 45 of the gate circuit 42a thereby rendering this gate circuit conductive, and the 150 cycle beat frequency signal is accordingly passed by the gate circuit 42a to the modulator 17 for modulation as a reference signal on the 1767.240 kilocycle carrier wave radiated by the transmitter 14. This modulated carrier wave, indicated by the solid line arrow 94, is radiated to and is accepted by the receiver 54 at the receiving unit 13. Simultaneously, as indicated by the solid line arrows 95 and 96 in Fig. 1, the 1783.00 kilocycle and the 1783.240 kilocycle carrier waves radiated by the transmitters 33 and 23 are radiated to and are accepted by the receiver 40 at the transmitting unit 10, which receiver is effective to reproduce the 240 cycle difference frequency between these carriers as a beat frequency output signal which is supplied through the band pass filter 43b to the control terminals of the gate circuit 43a. Likewise, this 240 cycle beat frequency signal is supplied to one set of input terminals of the mixer 41, the other set of input terminals of which are supplied with the 150 cycle beat frequency signal produced at the receiver 39. The mixer 41 functions, as heretofore described, to supply a 90 cycle beat frequency signal representing the difference between the 150 cycle and 240 cycle signals, and this 90 cycle signal passes through the low pass filter 44 and the conductive gate 43a to the modulator 28 for modulation on the 1798.00 kilocycle carrier wave radiated by the transmitter 15. As indicated by the solid line arrow 97, this modulated carrier wave is radiated from the transmitter 15 to the receiver 53 at the receiving unit 13. Thus, it will be seen that during this portion of the cycle the transmitters 14 and 15 operate as modulated reference signal transmitters to supply modulated signals to the receiving unit 13.

At the same time, and as indicated by the solid line arrows 98 and 99, the 1752.00 kilocycle and the 1752.150 kilocycle carrier waves radiated by the transmitters 32 and 22 are radiated to the receiving unit where they are accepted by the receiver 55. Similarly, as indicated by the solid line arrows 100 and 101, the 1783.00 kilocycle and the 1783.240 kilocycle carrier waves radiated by the transmitters 33 and 23 are radiated to the receiving unit for acceptance by the receiver 56.

At the receiving unit 13, the modulated carrier wave represented by the solid line arrow 94, is received from the transmitter 14 by the receiver 54 and the 150 cycle modulation component is reproduced at the output terminals of the receiver 54 and supplied through the band pass filter 59b to the control terminals of the gate circuit 59a. At the same time, this 150 cycle signal which constitutes a reference signal, is supplied to the input terminals of the gate circuit 59a and passes through the gate to the left hand terminals of the phase meter 67. At the receiver 55, the 150 cycle beat frequency which exists between the carriers from the transmitters 32 and 22 represented by the solid line arrows 98 and 99, is reproduced and is delivered through the band pass filter 64b to the control terminals of the gate circuit 64a thereby rendering the gate circuit conductive so that the 150 cycle signal which is also supplied from the receiver 55 to the input terminals of the gate 64a will pass through the gate to the right hand terminals of the phase meter 67, which functions to measure the phase relationship between the 150 cycle reference and position indicating signals thereby providing a fine position indication of high phase sensitivity representing the position of the mobile unit 13 relative to the transmitting units 11 and 12.

Simultaneously, the 240 cycle beat frequency difference which exists between the carriers from the transmitters 33 and 23 represented by the solid line arrows 100 and 101, is reproduced as a 240 cycle beat frequency signal at the output terminals of the receiver 56, and this beat frequency signal is supplied through the band pass filter 61b to the control terminals of the gate circuit 61a thereby rendering the gate circuit conductive to supply this 240 cycle beat frequency signal to one pair of terminals of the mixer or heterodyne means 66, which mixer is also supplied with the 150 cycle beat frequency signal developed at the receiver 55. In the mixer 66 a 90 cycle position indicating signal representing the difference frequency between the 150 cycle and 240 cycle signals is produced and this 90 cycle signal is supplied through the low pass filter 58b to the right hand terminals of the phase meter 70. This 90 cycle signal is likewise supplied, as shown, to the input terminals of the gate circuit 58a thereby rendering this gate circuit conductive.

At the receiver 53, the modulated wave from the transmitter 15 represented by the solid line arrow 97 is received and the 90 cycle modulation component on this carrier wave is reproduced at the output of the receiver 53 and supplied, as shown, to the input terminals of the gate circuit 58a, which gate circuit being conductive passes the signal to the left hand terminals of the phase meter 70 for phase comparison with the 90 cycle signal supplied to the right hand terminals thereof, thereby providing a coarse position indication of low sensitivity representative of the position of the mobile unit 13 relative to the transmitting units 11 and 12.

For the reasons pointed out in connection with the description of the first half cycle of operation, the position indications provided by the phase meter 67 will correspond to a phase sensitivity having iso-phase lines spaced approximately 280 feet apart on a line joining the units 11 and 12 and the position indications produced by the phase meter 70 will have a phase sensitivity corresponding to iso-phase lines spaced 15,800 feet apart on this same line. It will thus be seen that the phase meters 68 and 69 and the phase meters 67 and 70 function alternately to provide fine and coarse position indications of the mobile unit 13 relative to two different pairs of transmitters, i. e. the units 10 and 11 and the units 11 and 12, whereby a completely unambiguous and highly accurate fix of the position of the mobile receiving unit 13 is obtained providing the transmitting units 10—11, 11—12 are not separated by more than 15,800 feet. In other words, two pairs of intersecting sets of iso-phase lines of hyperbolic pattern are provided by indications of the phase meters 67—70, inclusive, one pair comprising a hyperbolic grid in which the iso-phase lines are spaced approximately 280 feet apart along the base lines of the respective pairs of transmitters and the other pair comprising similar patterns in which the iso-phase lines are spaced approximately 16,000 feet apart.

In Fig. 4 there is shown a mobile receiving unit 102 which is in most respects identical to the mobile receiving unit 13 of Fig. 2, and which may be employed in connection with the transmission system of Fig. 1. In the receiving unit of Fig. 4, however, a somewhat different gating arrangement is employed for supplying the signals of different frequencies to the mixers 65 and 66 which results in the elimination of the band pass filters 57b, 59b, 61b and 63b. In addition, certain of the elements are rearranged so that the various gate circuits are located immediately adjacent the various phase meters and are controlled by a single pair of band pass filters. Similar reference numerals have been employed in Fig. 4 to identify the equipment common to the receiving unit 13 and the receiving unit 102, and it will be observed that in Fig. 4 the control terminals of the gate circuits 57a, 62a and 63a, as well as the gate circuit 60a, are supplied through the band pass filter 60b while the control terminals of the gate circuits 58a, 59a and 61a, as well as the gate circuit 64a, are supplied through the band pass filter 64b. Thus, the band pass filter 60b may be considered not only a part of the gate means 60, but also a part of the gate means 57, 62 and 63, while the band pass filter 64b forms a part not only of the gate means 64, but also a part of the gate means 58, 59 and 61. The operation of the receiving units of Figs. 2 and 4 is substantially identical except that during the first half cycle of the operation as described in connection with Fig. 2, i. e. when the carrier waves represented by the broken line arrows are being received, the 240 cycle position indicating signal developed at the receiver 54 and passed by the band pass filter 60b, not only renders the gate circuit 60a conductive for energizing the phase meter 68 from the receiver 54, but at the same time, through the conductors 103, renders the gate circuit 63a conductive to energize the phase meter 68 with the 240 cycle reference signal from the receiver 55. Likewise the 240 cycle signal passed by the band pass filter 60b is effective, through the conductors 103a and 103b, to render conductive the gate circuits 57a and 62a so as to energize the phase meter 69 with the 90 cycle position indicating and reference signals respectively supplied from the mixer 65 and the receiver 56.

Similarly, during the second half cycle of operation, the 150 cycle position indicating signal developed at the receiver 55 and passed by the band pass filter 64b not only renders the gate circuit 64a conductive for energizing the phase meter 67 from the receiver 55, but likewise, through the conductors 104, renders the gate circuit 59a conductive to energize the phase meter 67 with the 150 cycle reference signal from the receiver 54. Likewise the 150 cycle signal passed by the band pass filter 64b is effective through the conductors 104a and 104b to render conductive the gate circuits 61a and 58a so as to energize the phase meter 70 with the 90 cycle position indicating and reference signals respectively supplied from the mixer 66 and the receiver 53. In all other respects, the two receiving units are the same, Fig. 4 thus representing a receiving unit employing only two sharply tuned band pass filters.

It will be observed that in the above described embodiments of the invention, sharply tuned audio frequency band pass filters have been entirely eliminated from the signal circuits at both the transmitting units and at the receiving units, thus obviating the above referred to problems of balancing out undesirable phase shifts that occur in such sharply tuned filters upon slight variations in temperature frequency, etc. Likewise, it will be observed that narrow band pass filters are employed in this system only in the control circuits where phase shift problems are non-existent. All of the gate circuits as well as the low pass filters 44, 52, 58b and 62b have wide pass distortionless characteristics which do not give rise to phase shift problems.

In Figs. 5 and 6 another position indicating system embodying the present invention is shown, in which the number of transmitters as well as the number of carrier frequencies employed is reduced as compared to the system of Figs. 1 and 2. In this latter system, narrow band pass filters are employed in the signal circuits at the receiving unit, but only wide pass gate means are employed in the signal circuits at the transmitting units. The filters at the receiving unit are symmetrical, however, and since they are all in the same unit, any temperature variation which may occur will produce the same changes in the filter characteristics in each of the filters. Furthermore, the number of receivers employed at the receiving unit of Fig. 6 is reduced by one in comparison with the receiving units of Figs. 2 and 4.

Referring now specifically to Figs. 5 and 6, the system there shown constitutes a three-foci hyperbolic continuous wave system for providing position information at a mobile receiving unit 105 relative to the location of a plurality of spaced transmitting units 106, 107 and 108 which are preferably spaced in the same manner as the transmitting units 10, 11 and 12 of Fig. 1. As is described more fully hereinafter, each of the transmitting units 106 and 108 is equipped to radiate continuously a position indicating signal in the form of a carrier wave and to intermittently or alternately radiate a second carrier wave of still different frequency. On the other hand, the transmitting unit 107 is equipped to continuously radiate a carrier wave of still another frequency and alternately to radiate two additional pairs of position indicating signals in the form of carrier waves of still different frequencies. Specifically, the transmitting unit 106 comprises a continuously operative transmitter 109 and a transmitter 110 which is adapted to be alternately rendered operative and inoperative by a suitable relay 111.

The transmitter 110 is adapted to radiate a continuous carrier wave at a frequency of 1752.240 kilocycles and the transmitter 109 consists of a carrier wave oscillator 112 adapted for operation at a frequency of 1700.150 kilocycles, a modulator 113 and a power amplifier 114 whereby the output of the transmitter 109 constitutes a continuous carrier wave which, as is more fully described hereinafter, may have suitable modulation signals modulated thereon during certain periods of the transmitter operation. Similarly, the transmitting unit 108 comprises a continuously operative transmitter 115 and a transmitter 116 which is adapted to be alternately rendered operative and inoperative by a suitable relay 117. The transmitter 116 when rendered operative by the relay, radiates a continuous carrier wave at a frequency of 1752.600 kilocycles and the transmitter 115 includes a carrier wave oscillator 118 adapted for operation at a frequency of 1798.510 kilocycles, a modulator 119 and a power amplifier 120 whereby the output of the transmitter 115 constitutes a continuous carrier wave which, as is more fully described hereinafter, may have suitable modulation signals modulated thereon during certain periods of operation. The transmitting unit 107 includes a continuously operative transmitter 121 adapted to radiate a continuous carrier wave at a frequency of 1752.00 kilocycles and a pair of additional transmitters 122 and 123 for respectively radiating additional carrier waves at frequencies of 1700.00 kilocycles and 1798.00 kilocycles together with switching means for alternately rendering one or the other of the transmitters 122 and 123 operative. The switching means which is similar to that employed in the system of Fig. 1, comprises a commutating ring 124 adapted to be driven at a constant speed, as indicated in Fig. 5, by a synchronous motor and gear train unit 125. It is believed that the manner in which the commutating ring 124 controls the transmitters 122 and 123 will be entirely apparent from the description of the corresponding equipment in Fig. 1, and consequently, the detailed description will not be repeated.

Referring again to the transmitter unit 106, this unit comprises, in addition to the transmitters 109 and 110, a pair of fixed tuned receivers 126 and 127, a frequency responsive gate means 128 and a rectifier and control tube unit 129 for controlling the relay 111. The gate means 128, in addition to a suitable gate circuit 128a which may be in all respects similar to the gate circuit 42a shown in Fig. 3, includes a 510 cycle band pass filter 128b. All of the above described equipment which goes to make up the transmitting unit 106 is connected, as shown in Fig. 5 of the drawing, as will become clearly apparent from the ensuing description of the operation.

The transmitting unit 108 which is substantially identical with the transmitting unit 106 except for the frequencies at which various pieces of equipment operate, includes, in addition to the transmitters 115 and 116, a pair of fixed tuned receivers 130 and 131, a frequency responsive gate means 132 and a rectifier and control tube unit 133. The gate means 132 includes, in addition to a suitable gate circuit 132a, a 150 cycle band pass filter 132b.

Referring now to Fig. 6, the mobile receiving unit 105 is shown as comprising a plurality of fixed tuned receivers 134, 135, 136, of which the receiver 134 and 136 are of the amplitude modulation type, a plurality of sharply tuned band pass filters 137, 138, 139, 140, 141, 142, 143, and 144, a plurality of low pass filters 145, 146, 147, and 148, a plurality of mixers or heterodyning means 149, 150, 177 and 178, and a plurality of phase measuring means or phase meters 151, 152, 153 and 154. As indicated in the drawings, the receiver 134 is fixed tuned to a center frequency of 1700 kilocycles and is designed to accept the carrier waves radiated by either of the transmitters 109 or 122, whether modulated or unmodulated; the receiver 136 is fixed tuned to a center frequency of 1798 kilocycles and is designed to accept the carrier waves radiated by either of the transmitters 115 or 123, whether modulated or unmodulated; and the receiver 135 is fixed tuned to a center frequency of 1752 kilocycles and is designed to accept the carrier waves radiated by any of the transmitters 110, 121 or 116. The band pass filters may be of any standard commercial construction as indicated in the description of Figs. 1 and 2, and the phase meters may likewise be of the character there indicated.

Considering now the operation of the system shown in Figs. 5 and 6, when the commutating ring 124 is in the position shown in Fig. 5, anode current will be supplied to the transmitter 122 and the 1700.00 kilocycle wave radiated by the transmitter will, as indicated by the solid line arrow 155, be radiated to and accepted by the receiver 130 at the transmitting unit 108, together with the 1700.150 kilocycle wave radiated from the transmitter 109 at the transmitting unit 106, the latter wave being indicated by a solid line arrow 156. The beat frequency of 150 cycles between the two carrier waves accepted by the receiver 130 is reproduced in the audio frequency section of the receiver and delivered through the 150 cycle band pass filter 132b to the input terminals of the rectifier and control tube 133. The rectifier and control tube is of the type well known in the art and is effective when selectively energized and deenergized to close and open the energizing circuit for the winding 157 of the control relay 117. As is apparent from the drawing, the relay 117 includes a pair of normally closed contacts 158 which normally complete the anode current circuit for the electron discharge tubes of the transmitter 116 and a pair of normally open contacts 159 which are effective when the relay 117 is operated to close the normally open anode current circuit for the electron tubes of the receiver 131. Accordingly, it will be apparent that by virtue of the production of the 150 cycle beat note signal at the receiver 130, the relay 117 is operated to render the transmitter 116 inoperative and to render the receiver 131 operative.

In addition to the above described control operation, the 150 cycle signal is transmitted through the band pass filter 132b to the control terminals of the gate circuit 132a so as to render the gate conductive, and accordingly, the 150 cycle signal from the receiver 130, which is also supplied to the input terminals of the gate circuit 132a, is supplied to the modulator 119 for modulation on the carrier wave radiated by the transmitter 115. In addition to the transmitters 122 and 109, the transmitters 121 and 110 are operative during this portion of the cycle of operation, the contacts 160 of the control relay 111 at the unit 106 being closed so as to render the transmitter 110 operative and the relay contacts 161 being open so as to render the receiver 127 at the unit 106 inoperative. The 1752.240 kilocycle carrier wave radiated by the transmitter 110 and the 1752.00 kilocycle carrier wave radiated by the transmitter 121, as respectively indicated by the solid line arrows 162 and 163, are radiated to and accepted by the receiver 131 at the unit 108 and the beat frequency of 240 cycles between the two carrier waves is reproduced in the audio frequency section of the receiver 131 and supplied, as indicated, to the input terminals of the conductive gate circuit from which it is supplied to the modulator 119 for modulation on the carrier wave radiated by the transmitter 115 as indicated by the solid line arrow 164, the 1798.510 kilocycle carrier wave radiated by the transmitter 115 and modulated with both the 150 cycle and 240 cycle beat frequency signal, is radiated to the mobile receiving unit 105 where it is accepted by the receiver 136.

At the same time that the modulated carrier wave represented by the solid line arrow 164 is being received at the receiving unit, a pair of carrier waves from the transmitter 119 and the transmitter 121 are being radiated to and accepted by the receiver 135 at the receiving unit 105, as indicated by the solid line arrows 165 and 166, and similarly, as represented by the solid line arrows 167 and 168, the carrier waves radiated by the transmitter 109 and the transmitter 122, are being radiated to and accepted by the receiver 134 at the receiving unit 105.

At the receiving unit 105, the beat frequency of 150 cycles which exists between the carrier waves from the transmitters 109 and 122 as represented by the solid line arrows 167 and 168, is reproduced in the audio section of the receiver 134 and is supplied through the band pass filter 137 to the left hand terminals of the phase meter 151. At the same time, the 150 cycle and 240 cycle reference signals which are modulated upon the carrier wave radiated from the transmitter 115 are reproduced in the receiver 136 at the mobile receiving unit and the 150 cycle reference signal is selected by the band pass filter 142 and supplied to the right hand terminals of the phase meter 151 which phase meter functions to measure the phase relationship between the two 150 cycle signals thereby providing a position indication of the mobile unit 105 relative to the transmitting units 106 and 107. The phase sensitivity of this position indication is determined by the mean or average frequency of the radiated waves represented by the solid line arrows 167 and 168 and since this mean frequency is 1700.075, the iso-phase lines corresponding to this position indication would be spaced apart a distance of approximately 289 feet along the line joining the units 106 and 107. This position indication may be considered as the fine or high phase sensitivity position indication with respect to the transmitting units 106 and 107.

Simultaneously, with the above described operation of the phase meter 151, the receiver 135 at the mobile receiving unit is effective to reproduce in the audio frequency section thereof the beat frequency difference of 240 cycles between the waves radiated by the transmitters 110 and 121 so as to produce in the output circuits of the receiver a 240 cycle beat frequency signal which is supplied, as shown, to the band pass filter 140, the output terminals of which are connected to one set of input terminals of the mixer 149. As shown in Fig. 6, the output terminals of the band pass filter 137 are likewise connected to the mixer 149 so as to supply thereto the same 150 cycle position indicating signal which is supplied to the phase meter 151. In the mixer 149, the 150 and 240 cycle signals are heterodyned and the difference or beat frequency signal of 90 cycles thereby produced is supplied through the low pass 90 cycle filter 145 to the left hand terminals of the phase meter 153. It will be recalled that both the 150 cycle and the 240 cycle reference signals modulated on the carrier wave represented by the solid line arrow 164 are reproduced in the output circuits of the receiver 136 and, as shown in the drawing, the 150 cycle signal after selection by the band pass filter 142, is supplied to one set of input terminals of the mixer 150 while the 240 cycle reference signal is supplied through the band pass filter 144 to another set of input terminals of the same mixer and after heterodyning the difference frequency signal of 90 cycles is passed through the low pass filter 147 to the right hand terminals of the phase meter 153 for phase comparison with the 90 cycle signal supplied to the left hand terminals thereof.

For the reasons fully explained in connection with the operation of the system of Figs. 1 and 2, the phase sensitivity of the 90 cycle indicating and reference signals is determined by the ratio between the mean frequencies of the two pairs of waves respectively heterodyned in the receivers 134 and 135 to produce the 150 cycle and 240 cycle position indicating signals. In other words, the phase sensitivity of the signals supplied to the phase meter 153 will correspond to a carrier signal of approximately 52.045 kilocycles and the iso-phase lines corresponding to this position indication will be spaced apart along a line joining the transmitting units 106 and 107, a distance of approximately 9500 feet whereby the phase meters 151 and 153 provide two position indications of different sensitivity indicative of the position of the mobile receiving unit 105 relative to the transmitting units 106 and 107.

At the end of the above described transmitting interval, the commutating ring 124 functions to interrupt the anode current circuits to the transmitter 122 thereby terminating operation of the phase meters 151 and 153 by reason of the fact that the 1700 kilocycle carrier wave from the transmitter 122 is no longer radiated to the receiver 134 at the mobile receiving unit 105 or to the receiver 130 at the transmitting unit 108 which causes the 150 cycle signals developed at these receivers to disappear. Disappearance of the 150 cycle signal at the receiver 130 deenergizes the control tube 133 and consequently, relay 117 operates to its normal position in which the receiver 131 is rendered inoperative and the transmitter 116 is rendered operative through closure of its anode current circuits. Disappearance of the 150 cycle signal at the transmitting unit 108 is also effective to render the gate circuit 132a non-conductive so as to prevent further modulation of the carrier wave radiated by the transmitter 115. Although the 240 cycle signal developed at the receiver 135 at the receiving unit 105 will not be interrupted immediately the signal alone cannot effect operation of any of the phase meters.

A short time interval after operation of the transmitter 122 is stopped, the commutating ring 124 functions to deliver anode current to the tubes of the transmitter 123 thus rendering this transmitter operative.

As soon as the transmitter 123 is rendered operative, the 1798.00 kilocycle carrier wave radiated by this transmitter together with the 1798.510 kilocycle carrier wave radiated by the transmitter 115 will be accepted, as indicated by the broken line arrows 169 and 170 respectively, at the receiver 126 of the transmitting unit 106. This receiver 126 functions to produce in its output circuit the 510 cycle beat frequency difference between these carrier waves and this 510 cycle signal is supplied through the band pass filter 128d to the rectifier and control tube 129 so as to energize the relay 111 which accordingly operates, as previously indicated, to render the transmitter 110 inoperative and render the receiver 127 operative. In addition, the 510 cycle beat frequency signal is supplied from the band pass filter 128b to the gate circuit 128a thereby rendering the gate circuit conductive and the 510 cycle beat frequency signal which is also supplied to the input terminals of the gate circuit is thus conducted to the modulator 113 for modulation on the carrier wave radiated by the transmitter 109.

As soon as the receiver 127 at the transmitting unit 106 is rendered operative, it becomes effective to accept the 1752.00 kilocycle carrier wave radiated by the transmitter 121 and the 1752.600 kilocycle carrier wave radiated by the transmitter 116 at the transmitting unit 108, these carrier waves being respectively represented by the broken line arrows 171 and 172. The receiver 127 functions to produce in its output circuits the 600 cycle beat frequency signal representing the frequency difference between these last mentioned carriers and this 600 cycle signal is supplied to the input terminals of the gate circuit 128 and through the gate circuit to the modulator 113 for modulation on the carrier wave radiated by the transmitter 109. Thus, the wave radiated by the transmitter 109, which is indicated by the broken line arrow 172a extending from the transmitter 109 to the receiver 134 at the mobile receiving unit, is modulated with both a 510 cycle reference signal and a 600 cycle reference signal. Simultaneously, with the production and transmission of these reference signals, the carrier waves radiated by the transmitters 121 and 116 are radiated to and accepted by the receiver 135 at the mobile receiving unit as represented by the broken line arrows 173 and 174, and the carrier signals respectively radiated by the transmitters 115 and 123 are radiated to and accepted by the receiver 136 at the mobile receiving unit as represented by the broken line arrows 175 and 176 respectively.

At the receiving unit 105, the operation is identical with that described in connection with the first half cycle of operation except that the phase meters 152 and 154 are now operated to provide fine and coarse position indications of the mobile receiving unit 105 relative to the transmitting units 107 and 108. Thus, the 510 cycle modulation component is reproduced at the receiver 134 and supplied through the band pass filter 138 to the left hand terminal of the phase meter 152 while a difference frequency of 510 cycles is produced at the receiver 136 and passed through the band pass filter 143 to the right hand terminals of the phase meter 152 for phase comparison. The fine or high phase sensitivity position indication thus produced has iso-phase lines spaced apart approximately 273 feet. At the same time, the 510 cycle and the 600 cycle modulation signals which are reproduced at the receiver 134 are supplied through the respective band pass filters 138 and 139 to the mixer 177 so as to produce a 90 cycle reference signal which passes through the low pass filter 146 to the left hand terminals of the phase meter 154. The 600 cycle difference frequency signal produced at the receiver 135 is supplied through the band pass filter 141 to the mixer 178, which is also supplied from the receiver 136 and the band pass filter 143 with the 510 cycle signal developed at the receiver 136. At the mixer 178, the two signals are heterodyned to provide a 90 cycle difference frequency phase indicating signal which passes through the low pass filter 148 to the right hand terminals of the phase meter 154 for phase comparison to provide a coarse position indication of the mobile receiving unit relative to the transmitters 107 and 108 having a low phase sensitivity corresponding to iso-phase lines having a spacing of approximately 10,600 feet.

It will thus be seen that the phase meter 151 and 153 and the phase meters 152 and 154 function alternately to provide fine and coarse indications of the position of the mobile unit 105 which correspond to two pairs of intersecting sets of iso-phase lines of hyperbolic pattern, one pair comprising a hyperbolic grid in which the iso-phase lines are spaced approximately 280 feet apart along the lines joining the respective pairs of transmitters, and the other pair comprising similar patterns in which the iso-phase lines are spaced approximately 10,000 feet apart.

While particular embodiments of the invention have been shown, it will be understood, of course, that the invention is not limited thereto since many modifications may be made and it is therefore contemplated by the appended claims to cover any such modifications as fall within the true spirit and scope of the invention.

What is claimed as new and desired to be secured by Letters Patent is:

1. A wave signal transmission system comprising at least a pair of transmitting units for radiating waves of different frequencies, means at one of said units for intermittently radiating one of said waves, means at another of said units at least in part responsive to said one wave for developing a reference signal, and means at said other unit including normally closed gate means responsive to said reference signal for modulating said reference signal upon a wave radiated by said other unit.

2. A wave signal transmission system comprising three spaced transmitting units for radiating at least two pairs of waves of different frequencies, one of said units including means for alternately radiating one wave of each pair, means at each of the other units responsive to the waves radiated at said one unit for alternately developing reference signals having different frequencies respectively related to the difference frequencies between the waves of said two pairs, and means at said other units including normally closed gate means respectively responsive to different ones of said reference signals for modulating corresponding reference signals upon the waves radiated by said other units.

3. A wave signal transmission system comprising three spaced transmitting units for radiating at least two pairs of waves of different frequencies, one of said units including means for alternately radiating one wave of each pair, means responsive to the waves radiated by said one unit for alternately developing reference signals having different frequencies respectively related to the difference frequencies between the waves of said two pairs, means at a first of the other units including normally closed gate means responsive to one of said reference signals for modulating said one reference signal upon the wave radiated by said first unit, and means at the second of the other units including normally closed gate means responsive to a second of said reference signals for modulating said second reference signal upon the wave radiated by said second unit.

4. A wave signal transmission system comprising three spaced transmitting units for radiating at least two pairs of waves, all of said waves having different frequencies, one of said units including means for alternately radiating one wave of each pair, means associated with at least a first of the other units and responsive only to one of the waves radiated by said one unit for intermittently developing a reference signal having a frequency related to the difference frequency between the frequency of said one wave and the frequency of the wave radiated by the second of said other units, and means at said first unit including normally closed gate means responsive to said reference signal for modulating said reference signal upon the wave radiated by said first unit.

5. A wave signal transmission system comprising a pair of spaced transmitting units, a plurality of pairs of transmitters for radiating waves of different frequencies, said transmitters of each pair being respectively disposed at different transmitting units, a plurality of heterodyning means respectively responsive to pairs of signals derived from said pairs of transmitters to produce beat frequency signals having frequencies respectively related to the beat frequencies between the pairs of waves radiated by said pairs of transmitters, other heterodyning means responsive to said beat frequency signals for producing at least one beat frequency reference signal having a frequency related to the beat frequency between at least one pair of said first mentioned beat frequency signals, and means including normally closed gate means responsive to one of said first mentioned beat frequency signals for modulating said reference signal upon a carrier for space radiation.

6. A wave signal transmission system comprising a pair of spaced transmitting units, a plurality of pairs of transmitters for radiating waves of different frequencies, said transmitters of each pair being respectively disposed at different transmitting units, a plurality of heterodyning means respectively responsive to pairs of signals derived from said pairs of transmitters to produce beat frequency signals having frequencies respectively related to the beat frequencies between the pairs of waves radiated by said pairs of transmitters, other heterodyning means responsive to said beat frequency signals for producing at least one beat frequency reference signal having a frequency related to the beat frequency between at least one pair of said first mentioned beat frequency signals, and means including normally closed gate means respectively responsive to said first mentioned beat frequency signals for modulating at least one of said beat frequency signals and said reference signal on space radiated carrier signals.

7. A wave signal transmission system comprising a pair of spaced transmitting units, a first pair of transmitters including a transmitter at each of said units for radiating a first pair of signals at different frequencies, a second pair of transmitters including a transmitter at each of said units for radiating a second pair of signals at different frequencies, each of said transmitters at one of said units radiating signals of higher frequency than the transmitter of that pair at the other of said units, a pair of heterodyning means respectively responsive to said pairs of signals to produce a pair of beat frequency signals having frequencies respectively representative of the beat frequencies between the signals of said first pair and between the signals of said second pair, other heterodyning means responsive to said pair of beat frequency signals for producing a reference signal representative of the beat frequency between said pair of beat frequency signals, and means including normally closed gate means responsive to one of said pair of beat frequency signals for modulating said reference signal upon a carrier for space radiation.

8. A wave signal transmission system comprising a pair of spaced transmitting units, a plurality of pairs of transmitters for radiating waves of different frequencies, said transmitters of each pair being respectively disposed at different transmitting units, means for intermittently operating the said transmitters at one of said units, a plurality of heterodyning means respectively responsive to pairs of signals derived from said pairs of transmitters to produce beat frequency signals having frequencies respectively related to the beat frequencies between the pairs of waves radiated by said pairs of transmitters, other heterodyning means responsive to said beat frequency signals for producing at least one beat frequency reference signal having a frequency related to the beat frequency between at least one pair of said first mentioned beat frequency signals, and means including normally closed gate means responsive to one of said first mentioned beat frequency signals for modulating said reference signal upon a carrier for space radiation.

9. A wave signal transmission system comprising a pair of spaced transmitting units, a plurality of pairs of transmitters for radiating waves of different frequencies, said transmitters of each pair being respectively disposed at different transmitting units, means for intermittently operating the said transmitters at one of said units, a plurality of heterodyning means respectively responsive to pairs of signals derived from said pairs of transmitters to produce beat frequency signals having frequencies respectively related to the beat frequencies between the pairs of waves radiated by said pairs of transmitters, other heterodyning means responsive to said beat frequency signals for producing at least one beat frequency reference signal having a frequency related to the beat frequency between at least one pair of said first mentioned beat frequency signals, and means including normally closed gate means respectively responsive to said first mentioned beat frequency signals for modulating at least one of said beat frequency signals and said reference signal on space radiated carrier signals.

10. A wave signal transmission system comprising a pair of spaced transmitting units, a first pair of transmitters including a transmitter at each of said units for radiating a first pair of signals at different frequencies, a second pair of transmitters including a transmitter at each of said units for radiating a second pair of signals at different frequencies, each of said transmitters at one of said units radiating signals of higher frequency than the transmitter of that pair at the other of said units, means for intermittently operating the said transmitters at one of said units, a pair of heterodyning means respectively responsive to said pairs of signals to produce a pair of beat frequency signals having frequencies respectively representative of the beat frequencies between the signals of said first pair and between the signals of said second pair, other heterodyning means responsive to said pair of beat frequency signals for producing a reference signal representative of the beat frequency between said pair of beat frequency signals, and means including normally closed gate means responsive to one of said pair of beat frequency signals for modulating said reference signal upon a carrier for space radiation.

11. Wave signal receiving apparatus for translating received space radiated signals into position indications comprising, a plurality of receivers for respectively receiving pairs of space radiated signals and for heterodyning said received pairs to produce beat frequency signals having frequencies respectively representative of the beat frequencies between the signals of each pair, heterodyning means responsive to said beat frequency signals for producing a position indicating heterodyne signal having a frequency representative of the beat frequency between said beat frequency signals, normally closed gate means responsive to one of said beat frequency signals for effecting energization of said heterodyning means by said beat frequency signals, means for receiving and reproducing a reference signal having a frequency equal to the frequency of said heterodyne signal and modulated on a space radiated carrier, phase measuring means for measuring the phase relationship between said heterodyne and reference signals, and normally closed gate means responsive to said heterodyne signal for supplying said reference signal to said phase measuring means.

12. Wave signal receiving apparatus for translating received space radiated signals into position indications comprising, a plurality of wave signal receivers for respectively receiving pairs of space radiated signals and for heterodyning said pairs to produce first and second beat frequency signals having frequencies respectively representative of the beat frequencies between the signals of said pairs, said first beat frequency signal constituting a first position-indicating heterodyne signal, heterodyning means responsive to said first and second beat frequency signals for producing a second position-indicating heterodyne signal having a frequency representative of the beat frequency between said first and second beat frequency signals and having a phase sensitivity different from that of said first heterodyne signal, normally closed gate means responsive to one of said first and second beat frequency signals for effecting energization of said heterodyning means by said beat frequency signals, means for receiving and reproducing first and second reference signals having frequencies respectively equal to the frequencies of said first and second heterodyne signals, phase measuring means for respectively measuring the phase relationship between corresponding heterodyne and reference signals to provide separate position indications of different sensitivity, normally closed gate means responsive to said first heterodyne and reference signals for supplying said first heterodyne and reference signals to one of said phase measuring means, and normally closed gate means responsive to said second heterodyne signal for supplying said second reference signal to a second phase measuring means to which said second heterodyne signal is supplied.

13. Wave signal receiving apparatus for translating received space radiated signals into position indications comprising, a plurality of wave signal receivers for respectively receiving pairs of space radiated signals and for heterodyning said pairs to produce first and second beat frequency signals having frequencies respectively representative of the beat frequencies between the signals of said pairs, said first beat frequency signal constituting a first position-indicating heterodyne signal, heterodyning means responsive to said first and second beat frequency signals for producing a second position-indicating heterodyne signal having a frequency representative of the beat frequency between said first and second beat frequency signals and having a phase sensitivity different from that of said first heterodyne signal, normally closed gate means responsive to said second beat frequency signal for effecting energization of said heterodyning means by said beat frequency signals, means for receiving and reproducing first and second reference signals having frequencies respectively equal to the frequencies of said first and second heterodyne signals, phase measuring means for respectively measuring the phase relationship between corresponding heterodyne and reference signals to provide separate position indications of different sensitivity, normally closed gate means responsive to said first heterodyne and reference signals for supplying said first heterodyne and reference signals to one of said phase measuring means, and normally closed gate means responsive to said second heterodyne signal for supplying said second reference signal to a second phase measuring means to which said second heterodyne signal is supplied.

14. Wave signal receiving apparatus for translating received space radiated signals into position indications comprising, a plurality of wave signal receivers for respectively receiving pairs of space radiated signals and for heterodyning said pairs to produce first and second beat frequency signals having frequencies respectively representative of the beat frequencies between the signals of said pairs, said first beat frequency signal constituting a first position-indicating heterodyne signal, heterodyning means responsive to said first and second beat frequency signals for producing a second position-indicating heterodyne signal having a frequency representative of the beat frequency between said first and second beat frequency signals and having a phase sensitivity different from that of said first heterodyne signal, means for receiving and reproducing first and second reference signals having frequencies respectively equal to the frequencies of said first and second heterodyne signals, phase measuring means for respectively measuring the phase relationship between corresponding heterodyne and reference signals to provide separate position indications of different sensitivity, normally closed gate means responsive to said first beat frequency signal for effecting energization of said heterodyning means by said beat frequency signals and for supplying said first heterodyne signal to one of said phase measuring means, other normally closed gate means responsive to said first reference signal for supplying said first reference signal to said one phase measuring means, and normally closed gate means responsive to said second heterodyne signal for supplying said second reference signal to a second phase measuring means to which said second heterodyne signal is supplied.

15. Wave signal receiving apparatus for translating received space radiated signals into position indications comprising, a plurality of wave signal receivers for respectively receiving pairs of space radiated signals and for heterodyning said pairs to produce first and second beat frequency signals having frequencies respectively representative of the beat frequencies between the signals of said pairs, said first beat frequency signal constituting a first position indicating heterodyne signal having a sensitivity determined by the average frequency of the radiated pair of signals from which it is derived, heterodyning means responsive to said first and second beat frequency signals for producing a second position indicating heterodyne signal having a frequency representative of the beat frequency between said first and second beat frequency signals and having a sensitivity determined by the relative values of the respective average frequencies of the pairs of radiated signals from which said first and second beat frequencies are derived, normally closed gate means responsive to one of said first and second beat frequency signals for effecting energization of said heterodyning means by said beat frequency signals, means for receiving and reproducing first and second reference signals having frequencies respectively equal to the frequencies of said first and second heterodyne signals, phase measuring means for respectively measuring the phase relationship between corresponding heterodyne and reference signals to provide separate position indications of different sensitivity, normally closed gate means responsive to said first heterodyne and reference signals for supplying said first heterodyne and reference signals to one of said phase measuring means, and normally closed gate means responsive to said second heterodyne signal for supplying said second reference signal to a second phase measuring means to which said second heterodyne signal is supplied.

16. Wave signal receiving apparatus for translating received space radiated waves into position indications, comprising a receiver for receiving a first pair of space radiated waves and for heterodyning said waves to produce a first heterodyne signal having a frequency related to the difference frequency between said waves, said receiver being alternately operative to receive and reproduce a first reference signal having a frequency representative of the difference frequency between a second pair of radiated waves and modulated upon one of said first pair of radiated waves, a second receiver for receiving and heterodyning said second pair of radiated waves to produce a second heterodyne signal having a frequency equaling the frequency of said first reference signal, said second receiver being alternately operative to receive and reproduce a second reference signal having a frequency representative of the difference frequency between said first pair of waves and modulated upon one of said second pair of waves, phase measuring means for measuring the phase relationship between said first heterodyne and second reference signals and between said second heterodyne and first reference signals to provide two indications respectively representative of the position of said receiving apparatus relative to two displaced sources of said waves, and a plurality of normally closed gate means coupled to the output sides of said receivers and respectively responsive to said reference and heterodyne signals for selectively rendering said phase measuring means operative.

17. Wave signal receiving apparatus for translating received space radiated waves into position indications, comprising a receiver for receiving a first pair of space radiated waves and for heterodyning said waves to produce a first heterodyne signal having a frequency related to the difference frequency between said waves, said receiver being alternately operative to receive and reproduce a first reference signal having a frequency representative of the difference frequency between a second pair of radiated waves and modulated upon one of said first pair of radiated waves, a second receiver for receiving and heterodyning said second pair of radiated waves to produce a second heterodyne signal having a frequency equaling the frequency of said first reference signal, said second receiver being alternately operative to receive and reproduce a second reference signal having a frequency representative of the difference frequency between said first pair of waves and modulated upon one of said second pair of waves, a first phase measuring device for measuring the phase relationship between said first heterodyne signal and said second reference signal to provide an indication of the position of said receiving apparatus relative to the source of one of said waves, a pair of normally closed gates respectively coupled to the output of said receivers and respectively responsive to said first heterodyne signal and said second reference signal for rendering said first phase measuring device operative, a second phase measuring device for measuring the phase relationship between said second heterodyne signal and said first reference signal to provide an indication of the position of said receiving apparatus relative to the source of a second of said waves, and a second pair of normally closed gate means respectively coupled to the output sides of said receivers and respectively responsive to said second heterodyne signal and said first reference signal for selectively rendering said second phase measuring device operative.

18. Wave signal receiving apparatus for translating received space radiated waves into position indications, comprising a first pair of receivers for receiving first and second pairs of space radiated waves and for heterodyning said waves in pairs to produce first and second heterodyne signals having frequencies respectively related to the difference frequencies between the waves of said pairs, said first heterodyning signal constituting a first position indicating signal, said receivers being alternately operative to receive and reproduce first and second reference signals, said first reference signal having a frequency representative of the difference frequency between a third pair of radiated waves, said second reference signal having a frequency representative of the beat frequency difference between the difference frequency of said third pair of waves and the difference frequency of a fourth pair of radiated waves, a second pair of receivers for receiving and heterodyning said third and fourth pairs of radiated waves to produce third and fourth heterodyne signals having frequencies respectively equaling the frequency of said first reference signal and said difference frequency of said fourth pair of waves, said second pair of receivers being alternately operative to receive and reproduce third and fourth reference signals, said third reference signal having a frequency representative of the difference frequency between said first pair of waves, said fourth reference signal having a frequency equal to the beat frequency difference between said first and second heterodyne signals, heterodyning means respectively responsive to said first and second heterodyne signals and to said third and fourth heterodyne signals to produce third and fourth position indicating signals having frequencies equal to the frequencies of said second and fourth reference signals, a first pair of phase measuring devices for measuring the phase relationships between said first position indicating signal and said third reference signal and between said third position indicating signal and said fourth reference signal to provide two indications of different sensitivity of the position of said receiving apparatus relative to the source of one of said waves, a second pair of phase measuring devices for respectively measuring the phase relationship between said second position indicating signal and said first reference signal and between said fourth position indicating signal and said second reference signal to provide two indications of different sensitivity of the position of said receiving apparatus relative to the source of a second of said waves, and means including normally closed gate means coupled to the output sides of said receivers and respectively responsive to said heterodyne signals, said reference signals and said position indicating signals for selectively rendering said phase measuring devices operative to measure the phase relationships between said reference and position indicating signals.

19. Wave signal receiving apparatus for translating received space radiated waves into position indications, comprising a first pair of receivers for receiving first and second pairs of space radiated waves and for heterodyning said waves in pairs to produce first and second heterodyne signals having frequencies respectively related to the difference frequencies between the waves of said pairs, said first heterodyning signal constituting a first position indicating signal, said receivers being alternately operative to receive and reproduce first and second reference signals, said first reference signal having a frequency representative of the difference frequency between a third pair of radiated waves and being modulated upon one of said first pair of radiated waves, said second reference signal having a frequency representative of the beat frequency difference between the difference frequency of said third pair of waves and the difference frequency of a fourth pair of radiated waves and being modulated upon one of said second pair of waves, a second pair of receivers for receiving and heterodyning said third and fourth pairs of radiated waves to produce third and fourth heterodyne signals having frequencies respectively equaling the frequency of said first reference signal and said difference frequency of said fourth pair of waves, said second pair of receivers being alternately operative to receive and reproduce third and fourth reference signals, said third reference signal having a frequency representative of the difference frequency between said first pair of waves and being modulated upon one of said third pair of waves, said fourth reference signal having a frequency equal to the beat frequency difference between said first and second heterodyne signals and being modulated upon one of said fourth pair of waves, heterodyning means respectively responsive to said first and second heterodyne signals and to said third and fourth heterodyne signals to produce third and fourth position indicating signals having frequencies equal to the frequencies of said second and fourth reference signals, a first pair of phase measuring devices for measuring the phase relationships between said first position indicating signal and said third reference signal and between said third position indicating signal and said fourth reference signal to provide two indications of different sensitivity of the position of said receiving apparatus relative to the source of one of said waves, a second pair of phase measuring devices for respectively measuring the phase relationship between said second position indicating signal and said first reference signal and between said fourth position indicating signal and said second reference signal to provide two indications of different sensitivity of the position of said receiving apparatus relative to the source of a second of said waves, and means including normally closed gate means coupled to the output sides of said receivers and respectively responsive to said heterodyne signals, said reference signals and said position indicating signals for selectively rendering said phase measuring devices operative to measure the phase relationships between said reference and position indicating signals.

20. A wave signal transmitting system comprising at least a pair of transmitting units for radiating waves of different frequencies, means at one of said units for intermittently radiating one of said waves, means at another of said units at least in part responsive to said one wave for developing a first reference signal, means at said other unit for developing a second reference signal, transmitter means at said other unit for radiating another of said waves, means controlled by said first reference signal for rendering said second reference signal means operative and said transmitter means inoperative during intervals when said one wave is being radiated, and means including normally closed gate means responsive to one of said reference signals for modulating said first and second reference signals upon another wave radiated by said other unit.

21. A wave signal transmitting system comprising at least a pair of transmitting units for radiating waves of different frequencies, means at one of said units for intermittently radiating one of said waves, means at another of said units at least in part responsive to said one wave for developing a first reference signal, means at said other unit for developing a second reference signal, transmitter means at said other unit for radiating another of said waves, means controlled by said first reference signal for rendering said second reference signal means operative and said transmitter means inoperative during intervals when said one wave is being radiated, and means including normally closed gate means responsive to one of said reference signals for modulating said first and second reference signals upon a common carrier.

22. In a position determining system a pair of spaced transmitters continuously operative to radiate distinguishable position indicating signals to a receiving point, a transmitting unit spaced from each of said transmitters and including means for alternately radiating two other distinguishable position indicating signals, heterodyning receivers respectively associated with said transmitters and each jointly responsive to the position indicating signal radiated by the other transmitter and to a different one of the signals radiated by said transmitting unit for producing beat frequency signals having frequencies respectively equal to the difference frequencies of the heterodyned signals, means including normally closed gate means at each of said transmitters responsive to one of said beat frequency signals for modulating said beat frequency signals as reference signals upon the signals radiated by said transmitters, a pair of receivers at said receiving point each operative to receive and reproduce a different one of said reference signals, said last-named receivers also being alternately operative to heterodyne the position indicating singals which have a difference frequency equaling the frequency of the reference signal being reproduced by the other receiver of said pair and to reproduce such difference frequency signal, whereby two pairs of signals of matching frequencies are alternately developed at said receiving point, and phase measuring means at said receiving point for measuring the phase relationship between the signals of each pair, thereby alternately to produce indications representative of the position of said receiving point relative to different ones of said transmitters.

23. In a position determining system, a pair of spaced transmitters continuously operative to radiate distinguishable position indicating signals to a receiving point, a transmitting unit spaced from each of said transmitters and including means for alternately radiating two other distinguishable position indicating signals, heterodyning receivers respectively associated with said transmitters and each jointly responsive to the position indicating signal radiated by the other transmitter and to a different one of the signals radiated by said transmitting unit for producing beat frequency signals having frequencies respectively equal to the difference frequencies of the heterodyned signals, means including normally closed gate means at each of said transmitters responsive to said beat frequency signals for modulating said beat frequency signals as reference signals upon the signals radiated by said transmitters, a pair of receivers at said receiving point each operative to receive and reproduce a different one of said reference signals, said last-named receivers also being alternately operative to heterodyne the position indicating signals which have a difference frequency equaling the frequency of the reference signal being reproduced by the other receiver of said pair and to reproduce such difference frequency signal, whereby two pairs of signals of matching frequencies are alternately developed at said receiving point, phase measuring means at said receiving point for measuring the phase relationship between the signals of each pair, thereby alternately to produce indications representative of the position of said receiving point relative to different ones of said transmitters, and normally closed gate means coupled between said receivers and said phase measuring means and responsive respectively to said two pairs of matching signals for selectively rendering said phase measuring means operative.

24. In a position determining system a pair of spaced transmitting units each including a plurality of transmitters continuously operative to radiate a pair of distinguishable position indicating signals to a receiving point, a third transmitting unit spaced from each of said pair of transmitting units and including means for alternately radiating two other pairs of distinguishable position indicating signals, heterodyning receives respectively associated with said transmitters and each jointly responsive to a different one of the position indicating signals radiated from the other of said pair of transmitting units and to a different one of the signals radiated by said third transmitting unit for producing beat frequency signals having frequencies respectively equal to the difference frequencies of the heterodyned signals, means including normally closed gate means at each of said pair of transmitting units responsive to one of said beat frequency signals for modulating one of said beat frequency signals as a first reference signal upon one of the signals radiated from said transmitting unit, heterodyning means at each of said pair of transmitting units for heterodyning a pair of said beat frequency signals to produce a second reference signal, means including normally closed gate means responsive to another of said beat frequency signals for modulating said second reference signals upon other signals radiated from each of said pair of transmitting units, a plurality of pairs of receivers at said receiving point each operative to receive and reproduce a different one of said reference signals, said last-named receivers also being alternately operative to heterodyne the position indicating signals which have a difference frequency equaling the frequencies of the beat frequency signals produced at said pair of transmitting units whereby two pairs of signals of matching frequencies and a given phase sensitivity are alternately developed at said receiving point, means at said receiving point for heterodyning said beat frequency signals in pairs to produce signals having frequencies equal to said second reference signals, whereby two other pairs of signals of matching frequencies and of different phase sensitivity are developed at said receiving point, phase measuring means at said receiving point for measuring the phase relationship between the signals of each pair, thereby alternately to produce two indications of different sensitivity representative of the position of said receiving point relative to each of said pair of transmitting units, and normally closed gate means coupled between said receivers and said phase measuring means and responsive respectively to said pairs of matching signals for selectively rendering said phase measuring means operative.

25. In a position determining system a pair of spaced transmitting units each including a pair of transmitters one of which is continuously operative to radiate distinguishable position indicating signals to a receiving point, a third transmitting unit spaced from each of said transmitters for radiating two other pairs of distinguishable position indicating signals and including means for alternately radiating one pair of said two other pairs of signals, heterodyning receivers respectively associated with said transmitters and each jointly responsive to a different one of the position indicating signals radiated from the other of said pair of transmitting units and to a different one of the signals radiated by said third transmitting unit for producing a pair of beat frequency signals at each of said pair of transmitting units having frequencies respectively equal to the difference frequencies of the heterodyned signals, means including normally closed gate means at each of said pair of transmitting units responsive to one of said beat frequency signals heterodyned from said alternately radiated signals for modulating said beat frequency signals as reference signals upon one of the signals radiated by said transmitters, a pair of receivers at said receiving point each operative to receive said modulated signals and to reproduce different ones of said reference signals, said last-named receivers also being alternately operative to heterodyne position indicating signals having a difference frequency equaling the frequency of one of the reference signals being reproduced by the other receiver of said pair and to reproduce such difference frequency signal, additional receiver means for alternately heterodyning the position indicating signals which have a difference frequency equaling the other reference signals reproduced by said pair of receivers whereby four pairs of signals of matching frequencies are alternately developed at said receiving point, heterodyning means at said receiving point for heterodyning corresponding pairs of said reference signals and difference frequency signals to produce additional pairs of signals of matching frequency having different phase sensitivities, phase measuring means at said receiving point for measuring the phase relationship between the signals of two of said four pairs and between the signals of said additional pairs, thereby alternately to produce two indications of different sensitivity representative of the position of said receiving point relative to each of said pair of transmitting units.

26. Wave signal receiving apparatus for translating received space radiated signals into position indications comprising, a plurality of receivers for respectively receiving pairs of space radiated signals and for heterodyning said received pairs to produce beat frequency signals having frequencies respectively representative of the beat frequencies between the signals of each pair, heterodyning means responsive to said beat frequency signals for producing a position indicating heterodyne signal having a frequency representative of the beat frequency between said beat frequency signals, means for receiving and reproducing a reference signal having a frequency equal to the frequency of said heterodyne signal and modulated on a space radiated carrier whereby a pair of signals of matching frequency is obtained, phase measuring means for measuring the phase relationship between said matching frequency heterodyne and reference signals, and normally closed gate means responsive to one of said matching signals for supplying at least one of said matching signals to said phase measuring means.

27. Wave signal receiving apparatus for translating received space radiated signals into position indications comprising, a plurality of wave signal receivers for respectively receiving pairs of space radiated signals and for heterodyning said pairs to produce first and second beat frequency signals having frequencies respectively representative of the beat frequencies between the signals of said pairs, said first beat frequency signal constituting a first position-indicating heterodyne signal, heterodyning means responsive to said first and second beat frequency signals for producing a second position-indicating heterodyne signal having a frequency representative of the beat frequency between said first and second beat frequency signals and having a phase sensitivity different from that of said first heterodyne signal, means for receiving and repro- ducing first and second reference signals having frequencies respectively equal to the frequencies of said first and second heterodyne signals, phase measuring means for respectively measuring the phase relationship between corresponding heterodyne and reference signals to provide separate position indications of different sensitivity, normally closed gate means responsive to at least one of said first heterodyne and reference signals for supplying at least one of said first heterodyne and reference signals to one of said phase measuring means, and normally closed gate means responsive to at least one of said second heterodyne and reference signals for supplying at least one of said second heterodyne and reference signals to a second of said phase measuring means.

28. Wave signal receiving apparatus for translating received space radiated waves into position indications, comprising a receiver for receiving a first pair of space radiated waves and for heterodyning said waves to produce a first heterodyne signal having a frequency related to the difference frequency between said waves, said receiver being alternately operative to receive and reproduce a first reference signal having a frequency representative of the difference frequency between a second pair of radiated waves and modulated upon one of said first pair of radiated waves, a second receiver for receiving and heterodyning said second pair of radiated waves to produce a second heterodyne signal having a frequency equaling the frequency of said first reference signal, said second receiver being alternately operative to receive and reproduce a second reference signal having a frequency representative of the difference frequency between said first pair of waves and modulated upon one of said second pair of waves, phase measuring means for measuring the phase relationship between said first heterodyne and second reference signals and between said second heterodyne and first reference signals to provide two indications respectively representative of the position of said receiving apparatus relative to two displaced sources of said waves, and a plurality of normally closed gate means coupled to the output sides of said receivers and respectively responsive to at least some of said reference and heterodyne signals for selectively rendering said phase measuring means operative.

29. Wave signal receiving apparatus for translating received space radiated signals into position indications comprising, a plurality of wave signal receivers for respectively receiving pairs of space radiated signals and for heterodyning said pairs to produce first and second beat frequency signals having frequencies respectively representative of the beat frequencies between the signals of said pairs, said first beat frequency signal constituting a first position indicating heterodyne signal having a sensitivity determined by the average frequency of the radiated pair of signals from which it is derived, heterodyning means responsive to said first and second beat frequency signals for producing a second position indicating heterodyne signal having a frequency representative of the beat frequency between said first and second beat frequency signals and having a sensitivity determined by the relative values of the respective average frequencies of the pairs of radiated signals from which said first and second beat frequencies are derived, means for receiving and reproducing first and second reference signals having frequencies respectively equal to the frequencies of said first and second heterodyne signals, phase measuring means for respectively measuring the phase relationship between corresponding heterodyne and reference signals to provide separate position indications of different sensitivity, normally closed gate means responsive to at least one of said first heterodyne and reference signals for supplying at least one of said first heterodyne and reference signals to one of said phase measuring means, and normally closed gate means responsive to at least one of said second heterodyne and reference signals for supplying at least one of said second heterodyne and reference signals to a second of said phase measuring means.

JAMES E. HAWKINS.

No references cited.